United States Patent
Yamauchi et al.

(10) Patent No.: US 9,716,928 B2
(45) Date of Patent: Jul. 25, 2017

(54) COMMUNICATIONS APPARATUS, SYSTEM, AND COMMUNICATIONS METHOD

(71) Applicant: FUJITSU LIMITED, Kawasaki-shi, Kanagawa (JP)

(72) Inventors: Hiromasa Yamauchi, Usakos (NA); Koichiro Yamashita, Hachioji (JP); Takahisa Suzuki, Yokohama (JP); Koji Kurihara, Kawasaki (JP); Toshiya Otomo, Kawasaki (JP); Yuta Teranishi, Fukuoka (JP)

(73) Assignee: FUJITSU LIMITED, Kawasaki (JP)

(*) Notice: Subject to any disclaimer, the term of this patent is extended or adjusted under 35 U.S.C. 154(b) by 164 days.

(21) Appl. No.: 14/632,632

(22) Filed: Feb. 26, 2015

(65) Prior Publication Data

US 2015/0172791 A1 Jun. 18, 2015

Related U.S. Application Data

(63) Continuation of application No. PCT/JP2012/071916, filed on Aug. 29, 2012.

(51) Int. Cl.
*H04Q 9/00* (2006.01)
*H04W 84/18* (2009.01)
(Continued)

(52) U.S. Cl.
CPC ............. *H04Q 9/00* (2013.01); *H04L 67/12* (2013.01); *H04W 4/005* (2013.01); *H04W 4/006* (2013.01);
(Continued)

(58) Field of Classification Search
CPC ........... H04Q 9/00; H04L 67/04; H04L 67/12; H04L 67/18; H04L 67/1002;
(Continued)

(56) References Cited

U.S. PATENT DOCUMENTS 6,415,220 B1 7/2002 Kovacs
8,275,313 B1* 9/2012 Myers .................. H04W 84/18
370/235

(Continued)

FOREIGN PATENT DOCUMENTS

JP 60-220423 11/1985
JP 06-250819 9/1994

(Continued)

OTHER PUBLICATIONS

Extended European Search Report dated Sep. 17, 2015 in corresponding European Patent Application No. 12883842.2.

(Continued)

*Primary Examiner* — Orlando Bousono
(74) *Attorney, Agent, or Firm* — Staas & Halsey LLP

(57) ABSTRACT

A given communications apparatus is included among plural first communications apparatuses, among which at least execution results of data processing of the given communications apparatus is communicated by multi-hop communication whereby, the execution results are transmitted to a second communications apparatus that performs a process based on the execution results. The given communications apparatus includes a storage device storing therein identification information of a specified communications apparatus that requires plural hops to communicate with the second communications apparatus and is among the plural first communications apparatuses, exclusive of the given communications apparatus; and a wireless communications circuit that transmits to a nearby communications apparatus of the given communications apparatus, request information that includes the identification information stored in the storage device and that requests the specified communications apparatus to execute the data processing of the given (Continued)

communications apparatus and to transmit execution results of the data processing.

11 Claims, 16 Drawing Sheets

(51) Int. Cl.
    *H04W 4/00* (2009.01)
    *H04W 4/02* (2009.01)
    *H04L 29/08* (2006.01)

(52) U.S. Cl.
    CPC ............ *H04W 84/18* (2013.01); *H04L 67/04* (2013.01); *H04L 67/1068* (2013.01); *H04L 67/18* (2013.01); *H04W 4/023* (2013.01)

(58) Field of Classification Search
    CPC ........... H04L 67/1008; H04L 67/1068; H04W 4/005–4/006; H04W 4/023; H04W 84/18; H04W 24/00; G01D 21/00
    See application file for complete search history.

(56) References Cited

U.S. PATENT DOCUMENTS

| | | |
|---|---|---|
| 2003/0050980 A1 | 3/2003 | Dutta et al. |
| 2005/0090201 A1 | 4/2005 | Lengies et al. |
| 2006/0087992 A1* | 4/2006 | Ganesh ................ G01D 21/00 370/310 |
| 2006/0202834 A1* | 9/2006 | Moriwaki ............. G01D 21/00 340/573.1 |
| 2007/0171052 A1* | 7/2007 | Moriwaki ............. G01D 21/00 340/539.22 |
| 2007/0262863 A1* | 11/2007 | Aritsuka ................ H04B 17/27 340/539.22 |
| 2007/0280172 A1 | 12/2007 | Tan et al. |
| 2008/0031139 A1* | 2/2008 | Muro .................... H04W 28/08 370/237 |
| 2008/0288636 A1* | 11/2008 | Moriwaki ............. G01D 21/00 709/224 |
| 2011/0002241 A1* | 1/2011 | Phan ...................... H04W 8/08 370/254 |
| 2012/0316838 A1* | 12/2012 | Wheeler ................ H04L 67/12 702/188 |

FOREIGN PATENT DOCUMENTS

| | | |
|---|---|---|
| JP | 2001-045543 | 2/2001 |
| JP | 2002-218080 | 8/2002 |
| JP | 2007-158478 | 6/2007 |
| JP | 2007-243794 | 9/2007 |

OTHER PUBLICATIONS

Chang et al., "An Energy Efficient Data Query Architecture for Large Scale Sensor Networks", IEICE Trans. Commun., vol. E90-B, No. 2, Feb. 2007, pp. 217-227.

International Search Report mailed Nov. 27, 2012 in corresponding international application PCT/JP2012/071916.

Office Action of R.O.C. Patent Application 102120863 dated Dec. 26, 2014.

* cited by examiner

<IDENTIFICATION INFORMATION OF TRANSMISSION DATA>

| SIGNAL IDENTIFICATION INFORMATION | ASSIGNMENT DIRECTION | ASSIGNMENT-DESTINATION SENSOR NODE ID |
|---|---|---|

- EXECUTION REQUEST: 0
- REGISTRATION SIGNAL: 1
- RECEPTION SIGNAL: 2
- BOOT SIGNAL: 3
- TRANSFER REQUEST: 4

- DIRECTION TOWARD-CENTER: 0
- DIRECTION AWAY-FROM-CENTER: 1

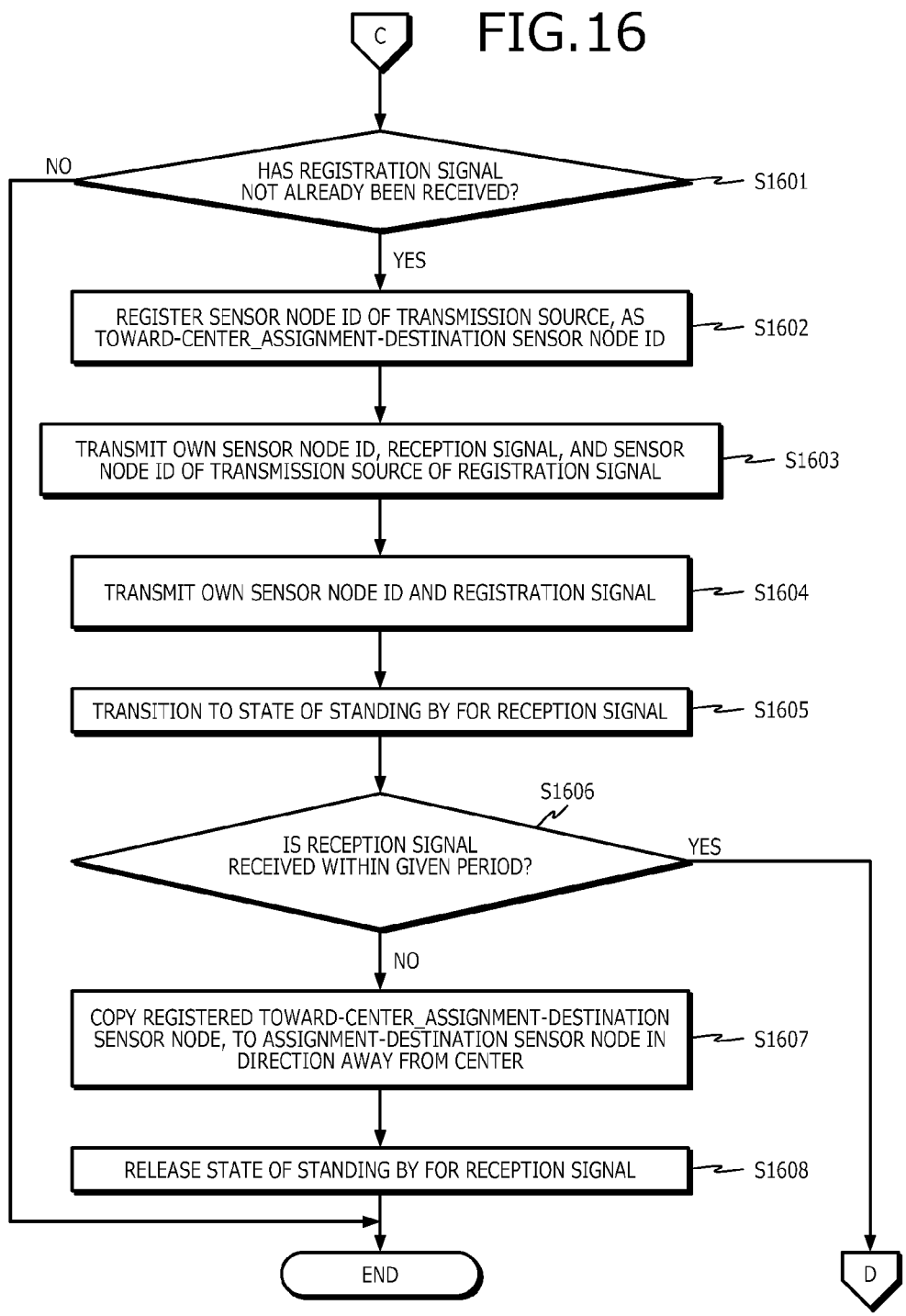

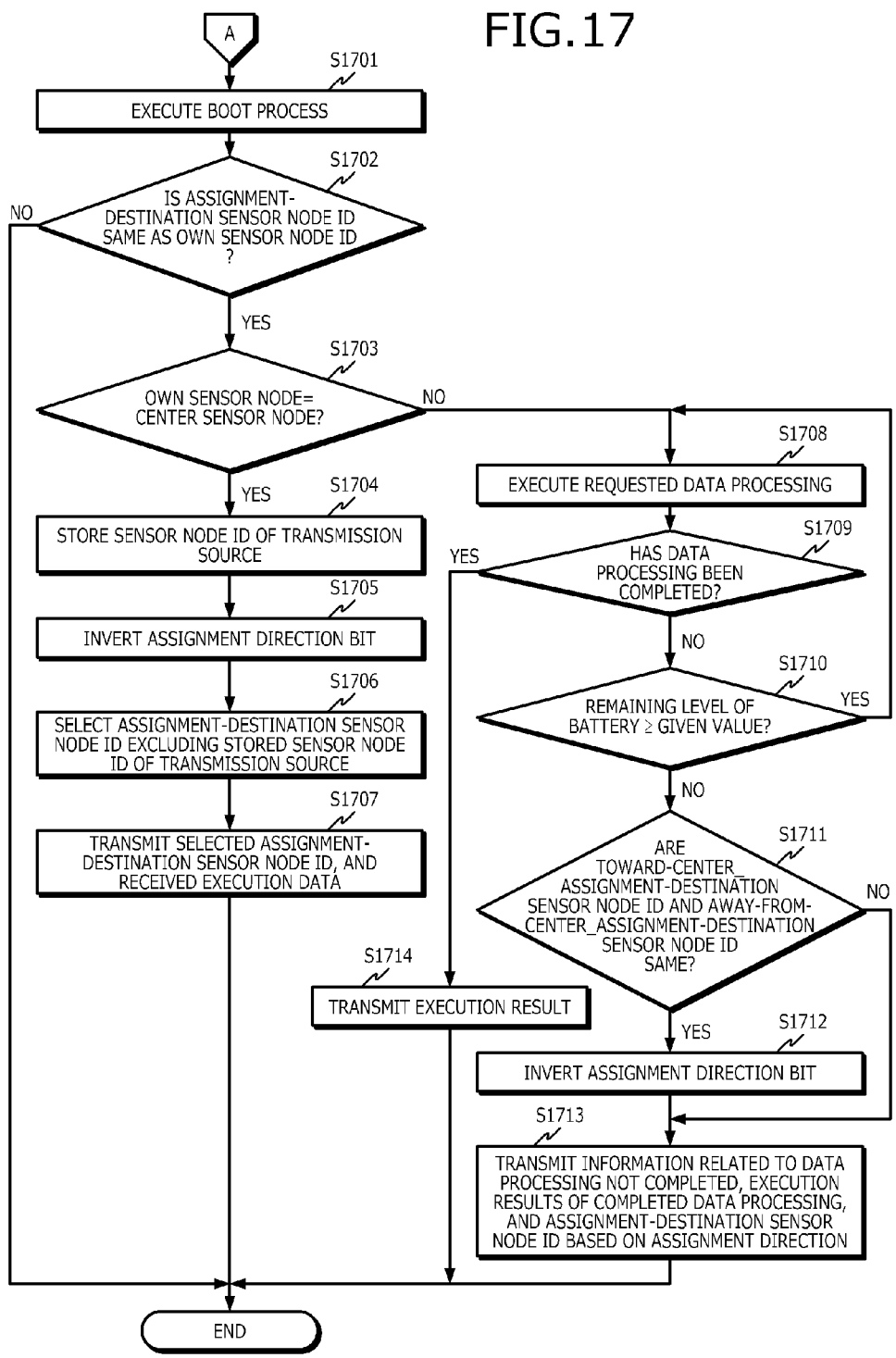

COMMUNICATIONS APPARATUS, SYSTEM, AND COMMUNICATIONS METHOD

CROSS REFERENCE TO RELATED APPLICATIONS

This application is a continuation application of International Application PCT/JP2012/071916, filed on Aug. 29, 2012 and designating the U.S., the entire contents of which are incorporated herein by reference.

FIELD

The embodiment discussed herein is related to a communications apparatus, a system, and a communications method.

BACKGROUND

Conventionally, sensor networks (wireless sensor networks (WSN)) are known in which plural sensor-equipped wireless terminals are interspersed in a given space and work in concert to enable environmental and/or physical states to be obtained. For example, according to a known technique, when a base station collects information related to detection by plural wireless sensor nodes, a path between the wireless sensor nodes is built (for example, refer to Japanese Laid-Open Patent Publication No. 2007-243794).

Further, for example, according to another known technique, the position information of a mobile terminal among plural sensor-equipped wireless terminals is identified based on the position information of a fixed terminal among the plural sensor-equipped wireless terminals (for example, refer to Japanese Laid-Open Patent Publication No. 2001-45543).

Nonetheless, if a terminal cannot execute data processing thereof at the terminal consequent to hardware resources of the terminal, results of the processing may not reach an apparatus that executes a process based on the processing results of the data processing.

SUMMARY

According to an aspect of an embodiment, a given communications apparatus is included among plural first communications apparatuses, among which at least execution results of data processing of the given communications apparatus is communicated by multi-hop communication whereby, the execution results are transmitted to a second communications apparatus that performs a process based on the execution results. The given communications apparatus includes a storage device storing therein identification information of a specified communications apparatus that requires plural hops to communicate with the second communications apparatus and is among the plural first communications apparatuses, exclusive of the given communications apparatus; and a wireless communications circuit that transmits to a nearby communications apparatus of the given communications apparatus, request information that includes the identification information stored in the storage device and that requests the specified communications apparatus to execute the data processing of the given communications apparatus and to transmit execution results of the data processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a flowchart (part 2) depicting an example of a procedure of a process performed by the sensor node according to the second example; and FIG. 17 is a flowchart (part 3) depicting an example of a procedure of a process performed by the sensor node according to the second example.

DESCRIPTION OF EMBODIMENTS

An embodiment of a communications apparatus, a system, and a communications method according to the present invention will be described in detail with reference to the accompanying drawings. In a sensor network system described in the present embodiment, numerous sensors are installed in a given area; each of the sensors wirelessly transmits detection information related to detection by the sensor, and collects detection information via a parent device that can wirelessly communicate with the sensors in the arrangement area. Herein, an apparatus equipped with a sensor and a processor capable of processing data related to sensing by the sensor is called a sensor node. For example, several hundred to several tens of thousands of the sensor nodes are assumed to be provided in the given area.

Figure 1:
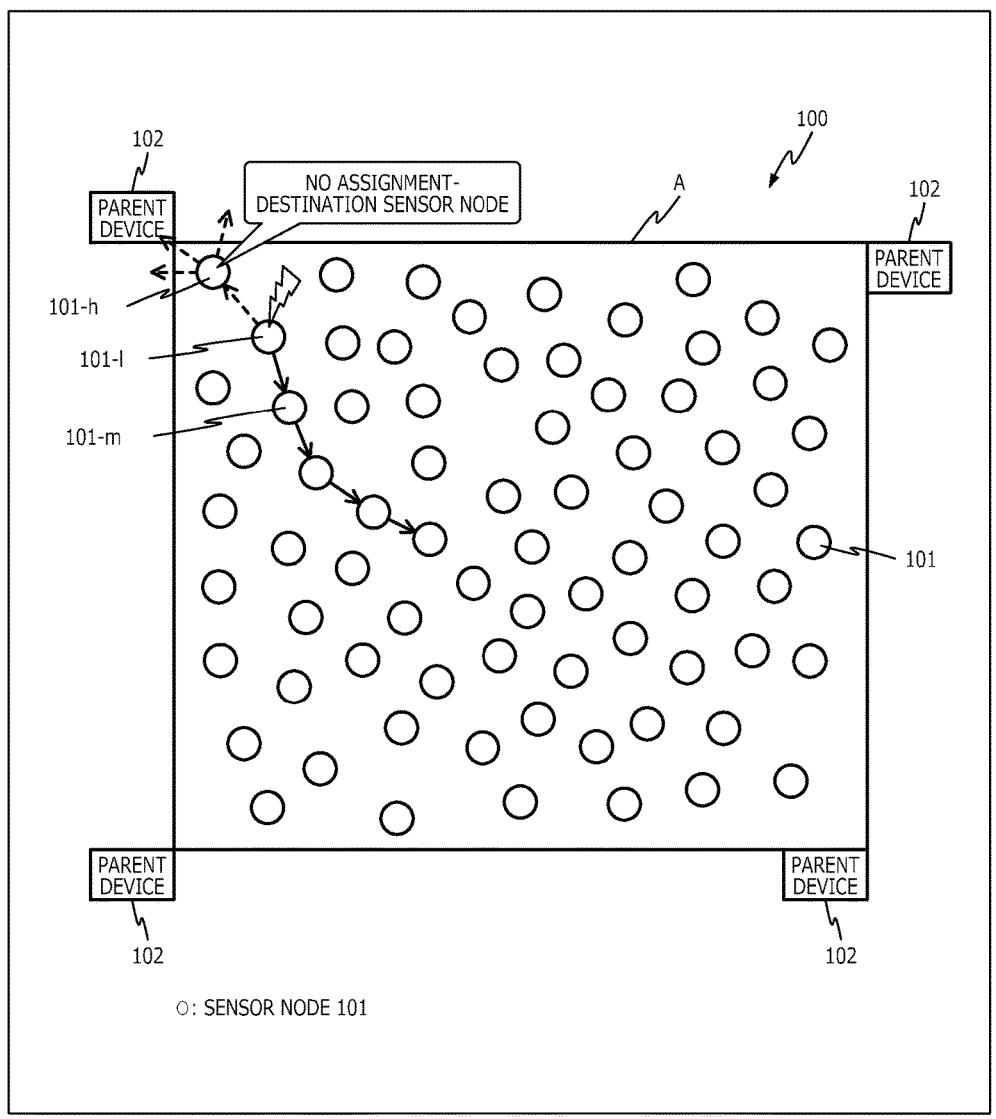
FIG. 1 is a diagram depicting a first example of the present invention.

FIG. 1 is a diagram depicting a first example of the present invention. A sensor network system 100, for example, includes sensor nodes 101 that are first communications apparatuses, and a parent device 102 that is a second communications apparatus. The parent device 102 executes a process based on execution results of the data processing of at least any one of the sensor nodes 101. As depicted in FIG. 1, the parent device 102 may also be provided in plural. The sensor nodes 101 are arranged in a given area A. The sensor nodes 101 are installed over a wide range and therefore, not all of the sensor nodes 101 can directly transmit data to the parent device 102. Thus, the results of data processing that corresponds to sensing results are assumed to reach the parent device 102 by multi-hop communication through other sensor nodes 101.

For example, the sensor nodes 101 are not equipped with high-performance processors or large-capacity memory. Therefore, a sensor node 101 may be unable to complete the data processing thereof. For example, if the performance of the equipped processor is low, the next sensing event may occur before the sensor node 101 finishes executing the data processing corresponding to the current sensor event. Further, for example, the sensor node 101 is equipped with a harvester described hereinafter, whereby the sensor node 101 generates electrical power, and stores the generated electrical power by a battery described hereinafter. The amount of electrical power generated by the harvester in the sensor node 101 and the amount of electrical charge stored by the battery is small and therefore, the battery may become exhausted before the data processing is completed.

Thus, in the present embodiment, if the data processing corresponding to a sensing event that occurred at a sensor node 101 cannot be completed, the sensor node 101 requests another sensor node 101 to execute the data processing. As a result, even if a sensor node 101 cannot finish executing the data processing thereof, the sensor node 101 can cause the execution of the data processing to be completed by another sensor node 101. As a result, the degree of certainty that the processing results will reach the parent device 102 can be improved. If the execution is not completed by the requested sensor node 101, the requested sensor node 101 further requests another sensor node 101 for the execution, enabling the execution of the data processing to be completed in stages by the sensor nodes 101.

As depicted in FIG. 1, for example, a sensor node 101-*l* assigns the execution of the data processing to a sensor node 101-*h* that can directly communicate with the parent device 102 (dashed-lined arrow in FIG. 1). If the assignment-destination sensor node 101-*h* does not complete the execution of the data processing, there is no assignment-destination sensor node 101 subsequent to the assignment-destination sensor node 101-*h*. In other words, the execution of the data processing may not be completed by the request-destination requested to execute the data processing. For example, the processor equipped on the sensor node 101 does not have high performance and if the sensor nodes 101 are to execute a scheduling process, the load at the sensor nodes 101 becomes great. Thus, the sensor node 101-*l* requests a sensor node 101-*m* that requires plural hops in communicating with the parent device 102 to execute the data processing (solid-lined arrow in FIG. 1). One hop is the distance enabling direct communication. Hop count is the number of transfers when performing multi-hop communication.

As a result, even if the data processing is not completed by an assignment-destination sensor node 101, the data processing can be executed in stages by the sensor nodes 101 and completed, enabling the degree of certainty that the processing results will reach the parent device 102 can be improved.

Further, as depicted in FIG. 1, if the execution of the data processing is requested, the assignment-destination sensor node 101 is assumed to be a sensor node 101 with which direct communication is possible. As a result, sensor nodes 101 other than the assignment-destination sensor node 101 need not perform a process of transferring request information, etc. of the data processing. Therefore, the execution of the data processing can be completed without increasing the load on sensor nodes 101 not involved in the execution of the data processing.

An example will be given of a case where the given area A is of a shape as depicted in FIG. 1 and the parent devices 102 are arranged at the four corners. If data processing is assigned in a direction toward a sensor node 101 at the center of the given area A, the data processing can be requested to a sensor node 101 requiring plural hops in communicating with the parent device 102. Herein, the sensor node 101 at the center is abbreviated as the center sensor node 101.

In the present embodiment, each sensor node 101 requests the sensor nodes 101 between the sensor node 101 and the center sensor node 101 to execute the data processing. In other words, the sensor nodes 101 assign execution requests for the data processing, toward the center sensor node 101. The assignment-destination sensor nodes 101 between the sensor node 101 and the center sensor node 101 are called toward-center_assignment-destination sensor nodes 101. Further, after the execution request for the data processing has reached the center sensor node 101, the sensor node 101 requests a sensor node 101 is not between the sensor node 101 and the center sensor node 101 to execute the data process. An assignment-destination sensor node 101 that is not between the sensor node and center sensor node is called an away-from-center_assignment-destination sensor node 101. Further, data processing by a sensor node 101 in response to an event that occurred is called the data processing of the sensor node 101.

Figure 2:
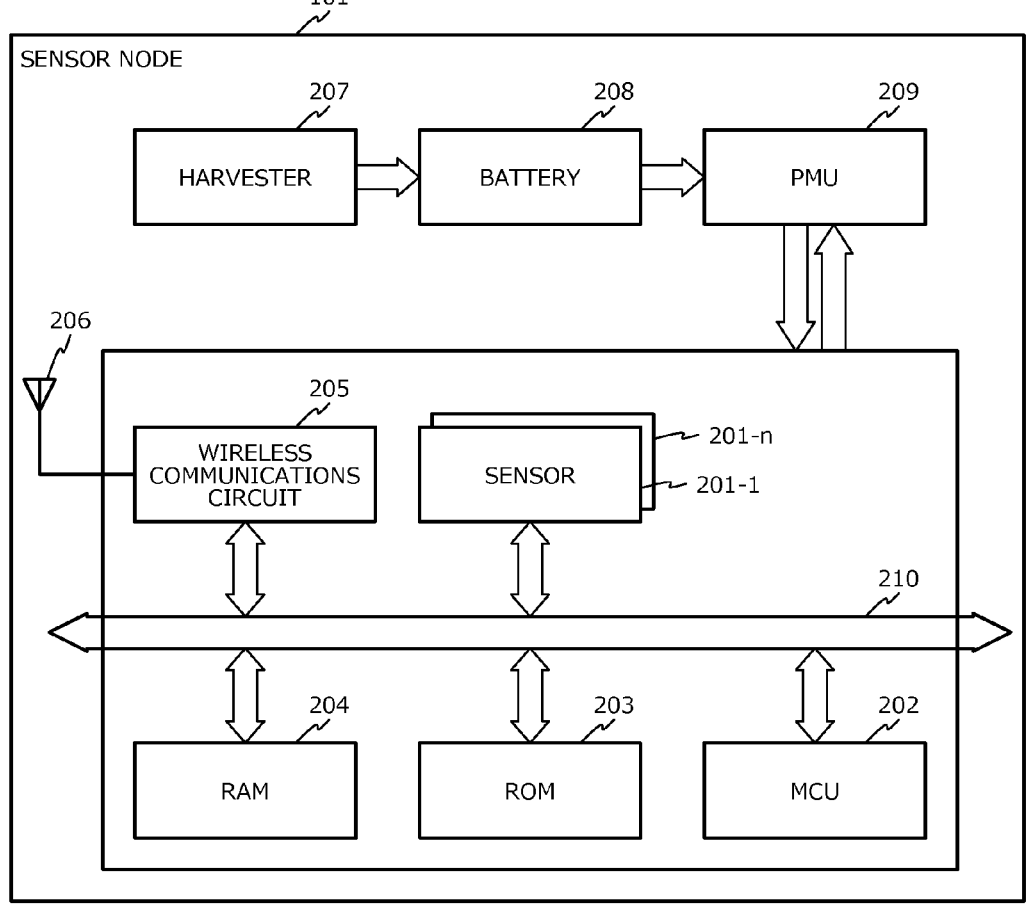
FIG. 2 is a block diagram depicting an example of a hardware configuration of a sensor node.

FIG. 2 is a block diagram depicting an example of a hardware configuration of a sensor node. The sensor node 101 has sensors 201-1 to 201-*n*, a microprocessor (micro control unit (MCU)) 202, read-only memory (ROM) 203, random access memory (RAM) 204, a wireless communications circuit 205, and an antenna 206. The sensor node 101 has an internal bus 210 connecting the sensors 201, the wireless communications circuit 205, the MCU 202, the RAM 204, and the ROM 203. The sensor node 101 further has a harvester 207, a battery 208, and a power management unit (PMU) 209.

The sensors 201-1 to 201-*n* ($n \geq 1$) detect a given displacement occurring at the respective installation sites. A piezoelectric element that detects pressure at the installation site, an element that detects temperature, a photoelectric element that detects light, and the like may be used as the sensor 201, for example. The antenna 206 transmits and receives radio waves wirelessly communicated with the parent device 102. The wireless communications circuit (radio frequency (RF)) 205 outputs received wireless radio waves as received signals and transmits transmission signals as wireless radio waves, via the antenna 206.

The MCU 202 processes data related to detection by the sensors 201. The RAM 204 stores transient data of the processing at the MCU 202. The ROM 203 stores process programs and the like executed by the MCU 202.

The harvester 207 generates electrical power based on energy changes, such as changes in light, vibration, temperature, wireless radio waves (received radio waves), etc., occurring in the external environment of the installation site of the sensor node 101. The harvester 207 may generate electrical power according to the displacement detected by the sensors 201. The battery 208 stores the electrical power generated by the harvester 207. In other words, the sensor node 101 does not need a secondary battery or an external power source, and can generate internally, the electrical power necessary for operation.

The PMU 209 controls the supply of the electrical power stored by the battery 208, as a driving power source of the components of the sensor node 101. For example, when the sensor 201 performs sensing processing, the PMU 209 supplies electrical power to the MCU 202 to invoke the MCU 202. Further, if the MCU 202 is not performing any processing, the PMU 209 ceases the power supply to the MCU 202.

Figure 3:
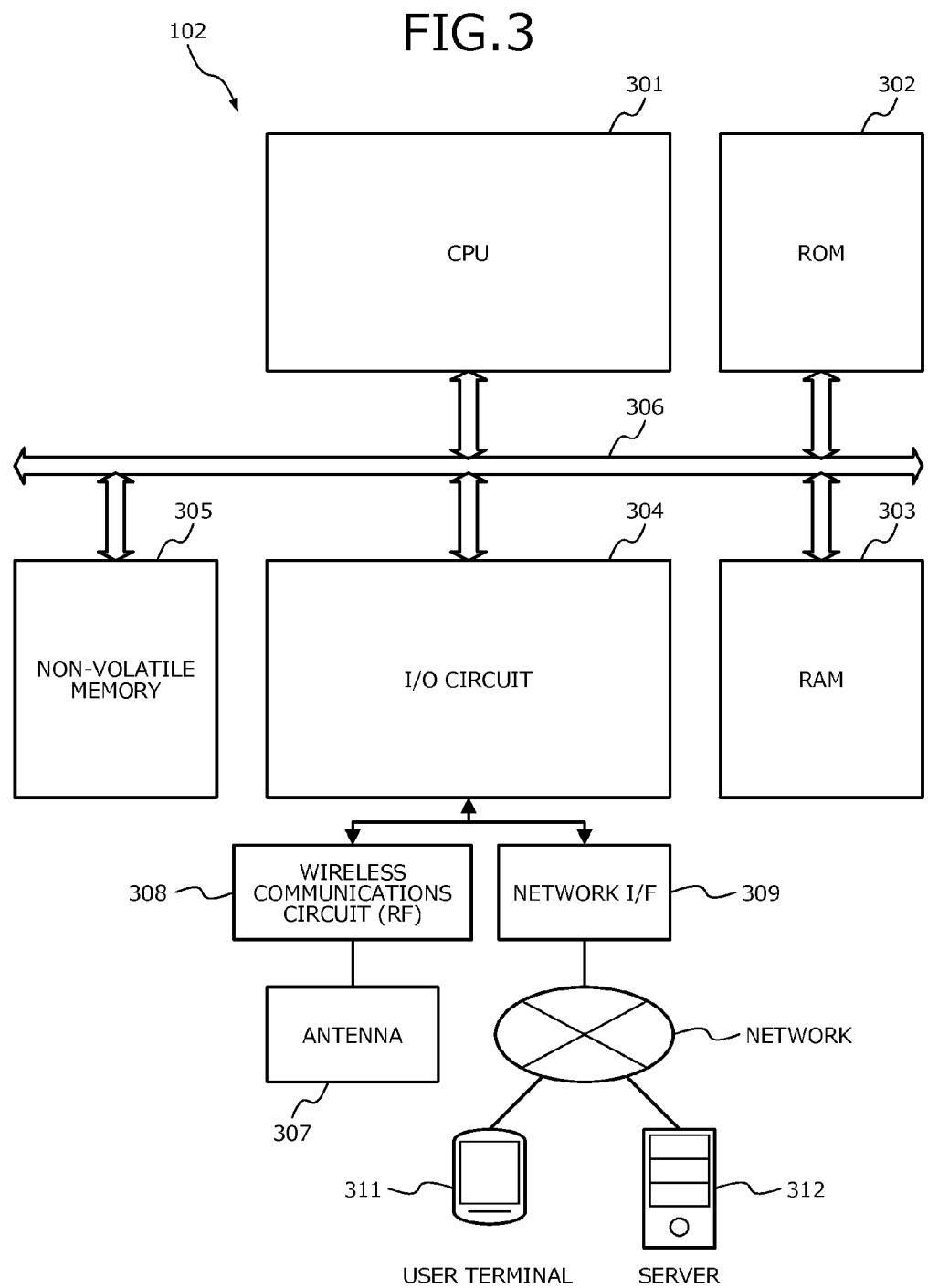
FIG. 3 is a block diagram depicting an example of a hardware configuration of a parent device.

FIG. 3 is a block diagram depicting an example of a hardware configuration of the parent device. The parent device 102 operates on an external power supply, unlike the sensor node 101. The parent device 102 has a processor (central processing unit (CPU)) that is more sophisticated that the processor (the MCU 202) of the sensor node 101, and large-capacity ROM 302 and RAM 303. The parent device 102 has non-volatile memory 305, and an interface (input/output (I/O)) circuit 304. The parent device 102 further has a bus 306 connecting the CPU 301, the ROM 302, the RAM 303, the I/O circuit 304, and the non-volatile memory 305.

Further, an antenna 307 and a wireless communications circuit (radio frequency (RF)) 308, and a network I/F 309 are connected to the I/O circuit 304. As a result, the parent device 102 can wirelessly communicate with the sensor node 101, via the antenna 307 and the wireless communications circuit 308. The parent device 102 can further communicate with external apparatuses, such as a user terminal 311 and a server 312 through a network NET such as the Internet, via the network I/F 309, by a TCP/IP protocol process.

Figures 4, 5:
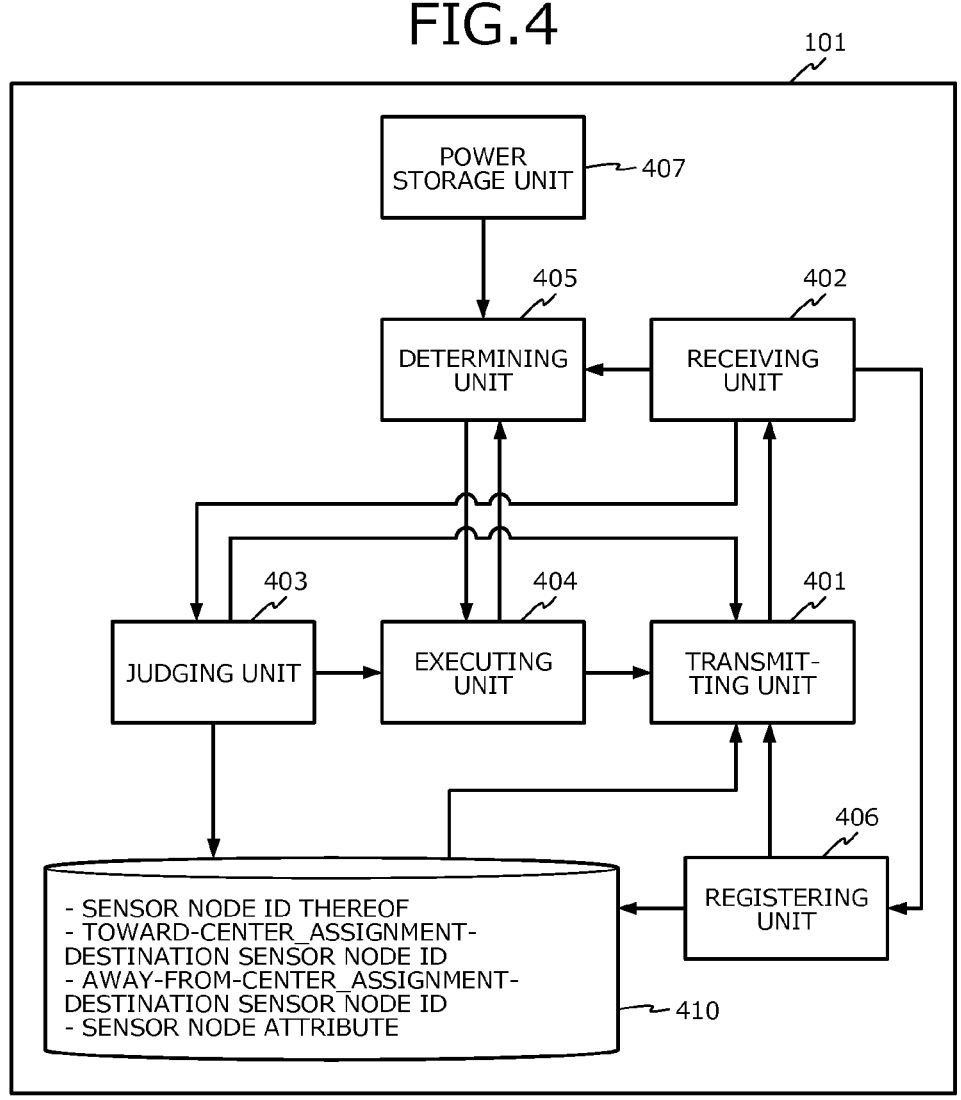
FIG. 4 is a block diagram depicting an example of a functional configuration of the sensor node.
FIG. 5 is a diagram depicting an example of transmission data identification information.

FIG. 4 is a block diagram depicting an example of a functional configuration of the sensor node. The sensor node 101 has a transmitting unit 401, a receiving unit 402, a judging unit 403, an executing unit 404, a determining unit 405, a registering unit 406, and a power storage unit 407. The transmitting unit 401 and the receiving unit 402, for example, are the wireless communications circuit 205 and the antenna 206. The power storage unit 407, for example, is the battery 208. For example, programs in which processing concerning the judging unit 403 to the registering unit 406 is encoded are stored in a storage device 410 such as the ROM 203. The MCU 202 reads the programs out from the storage device 410 and executes the processing encoded in the programs whereby, the processing of the units is realized. Further, the determining unit 405, for example, may be realized by the PMU 209.

The storage device 410 such as the ROM 203, the RAM 204, and the like in the sensor nodes 101 has sensor node identification (ID) of the sensor node 101 thereof. The storage device 410 further has a toward-center_assignment-destination sensor node ID that is first identification information, and an away-from-center_assignment-destination sensor node ID that is second identification information, and a sensor node attribute. The sensor node attribute is information indicating whether the sensor node thereof is the center sensor node.

FIG. 5 is a diagram depicting an example of transmission data identification information. Each transmission data includes signal identification information, assignment direction, an assignment-destination sensor node ID, and data. The identification information of transmission data is the signal identification information, assignment direction, and assignment-destination sensor node ID. The signal identification information is information that indicates the type of the signal. For example, if the transmission data is information requesting the execution of data processing, the signal identification information is set to 0. If the transmission data is information indicating a registration signal for registering the toward-center_assignment-destination sensor node ID into the storage device 410, the signal identification information is set to 1. If the transmission data is a reception signal indicating that a registration signal has been received, the signal identification information is set to 2. For example, if the transmission data is a boot signal requesting the center sensor node 101 to perform a registration process, the signal identification information is set to 3. For example, is the transmission data is a transfer request signal requesting transmission of execution results of data processing to the parent device 102, the signal identification information is set to 4.

The assignment direction and the assignment-destination sensor node ID are set when information requests computation. The assignment direction is a signal that requests data processing in a direction approaching the center sensor node 101, or in a direction away from the center sensor node 101. For example, when indicating a direction toward the center sensor node 101, the assignment direction is set to 0, and when indicating a direction away from the center sensor node 101, the assignment direction is set to 1.

Here, detailed description will be divided into a first example and a second example. In the first example, when an execution request for the data processing is assigned toward the center sensor node 101 and the execution request reaches the center sensor node 101, the execution request for the data processing is assigned away from the center sensor node 101. As a result, execution of the data processing can be requested to the sensor nodes 101 in stages. In the second example, when among the sensor nodes 101, an execution request for the data processing is assigned to a terminal sensor node 101 in the given area A, there is no subsequent request-destination and therefore, the execution request for the data processing is assigned to loop back. As a result, the execution of the data processing can be completed.

In the first example, when an execution request for the data processing is assigned toward the center sensor node 101 and the execution request reaches the center sensor node 101, the execution request for the data processing is assigned away from the center sensor node 101. As a result, the data processing can be executed in stages by the sensor nodes 101.

Concerning the sensor nodes 101, a process of registering into the storage device 410, an assignment-destination sensor node ID in a case of the data processing being assigned toward the center sensor node 101 will be described. Further, concerning the sensor nodes 101, a process of registering into the storage device 410, an assignment-destination sensor node ID in a case of the data processing being assigned away from the center sensor node 101 will be described.

Figure 6:
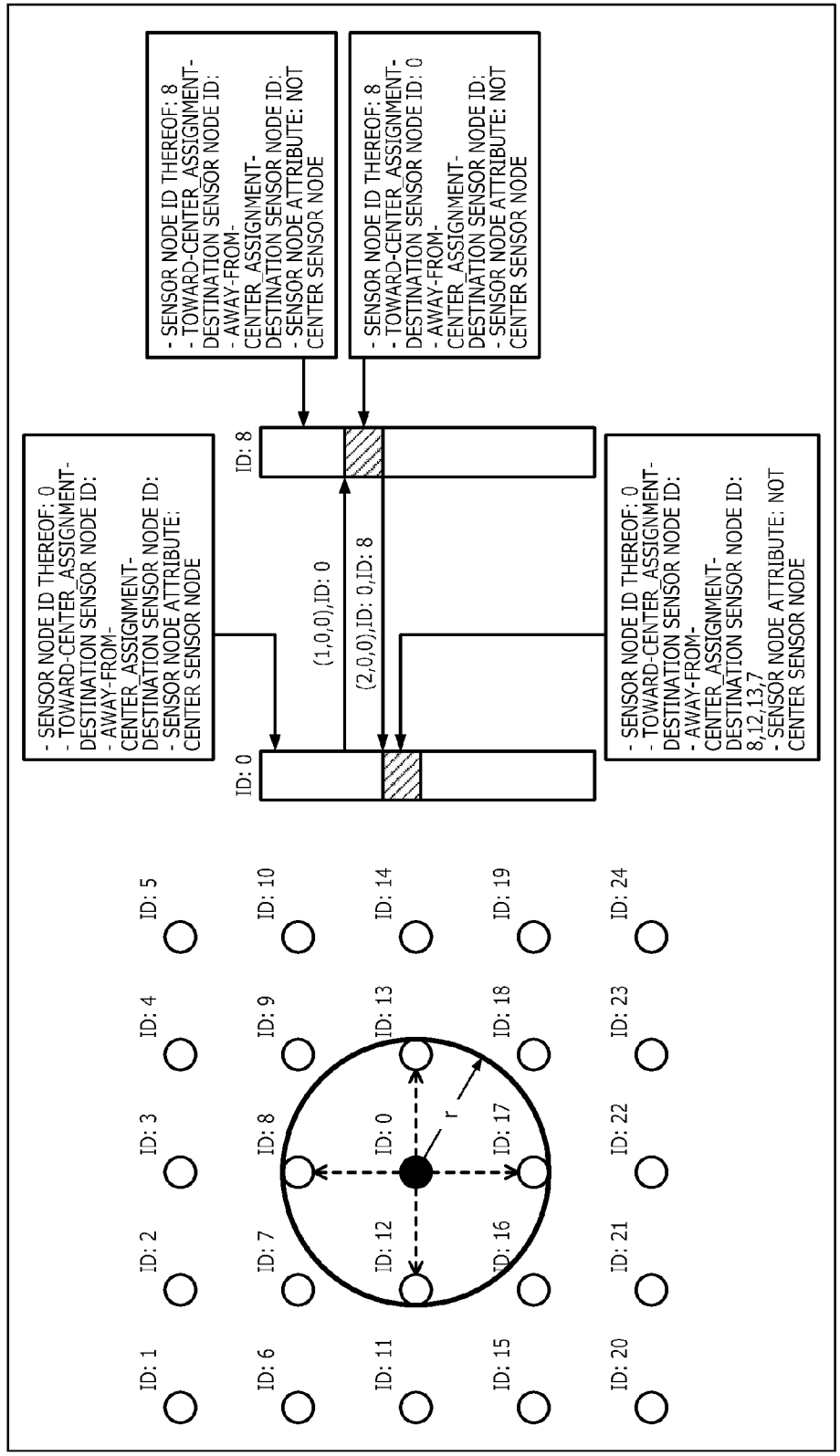
FIG. 6 is a diagram (part 1) depicting an example of a registration process.

FIG. 6 is a diagram (part 1) depicting an example of the registration process. In the example depicted in FIG. 6, a sensor node 101-0 is the center sensor node 101. The receiving unit 402-0 of the center sensor node 101 receives a boot signal from the parent device 102. The transmitting unit 401-0 of the center sensor node 101 includes the identification information of the center sensor node 101 and transmits a registration signal requesting a sensor node 101 near the center sensor node 101 to register an assignment-destination sensor node 101. More specifically, the transmitting unit 401-0 of the center sensor node 101 transmits a registration signal and the identification information of the center sensor node 101 to a sensor node 101 near the center sensor node 101. Since the signal is a registration signal, the identification information of the transmission data is (1, 0, 0).

The receiving unit 402 of the sensor node 101 near the center sensor node 101 receives the registration signal. More specifically, the receiving unit 402 receives the registration signal and the sensor node ID identifying the transmission source of the registration signal. In the example depicted in FIG. 6, the identification information of sensor nodes 101 that are at a distance r enabling communication with the center sensor node 101-0 includes 8, 12, 13, 17. The registering unit 406 registers into the storage device 410, the identification information of the sensor node 101 indicative of the transmission source of the registration signal, as a toward-center_assignment-destination sensor node ID. The registering unit 406 registers the identification information of the sensor node 101 that is the transmission source of the registration signal, as a toward-center_assignment-destination sensor node ID. Taking a sensor node 101-8 as an example, in the toward-center_assignment-destination sensor node ID, 0 is registered.

The transmitting unit 401 transmits to a nearby sensor node 101, a reception signal indicating that a registration signal has been received that includes the identification information of the sensor node 101 of the transmitting unit 401. More specifically, the transmitting unit 401 correlates and transmits to a nearby sensor node 101, a reception signal, the sensor node ID of the transmission source of the registration signal corresponding to the reception signal, and the sensor node ID of the sensor node 101 of the transmitting unit 401.

The receiving unit 402 of the center sensor node 101 receives the reception signal from the nearby sensor node 101. More specifically, the receiving unit 402 of the center sensor node 101 receives the reception signal. Since the sensor node ID of the transmission source of the reception signal is correlated with the reception signal, the registering unit 406 of the center sensor node 101 registers 8 as an away-from-center_assignment-destination sensor node ID. Similarly, the registering unit 406 of the center sensor node 101 registers 12, 13, and 7 as away-from-center_assignment-destination sensor node IDs.

Figure 7:
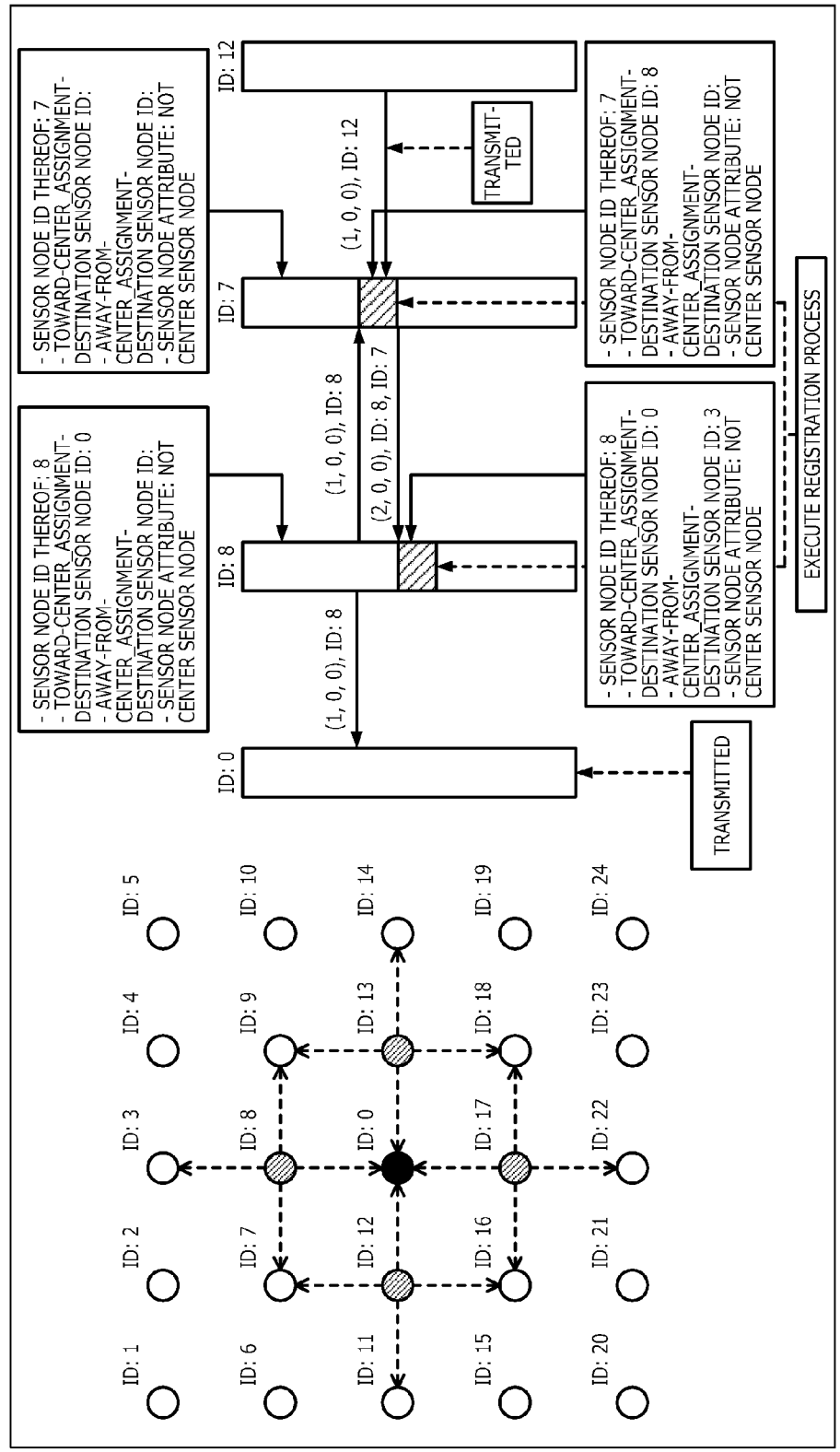
FIG. 7 is a diagram (part 2) depicting an example of the registration process.

FIG. 7 is a diagram (part 2) depicting an example of the registration process. The transmitting unit 401 newly transmits to a sensor node 101 near the sensor node 101 of the transmitting unit 401, a registration signal that includes the identification information of the sensor node 101 of the transmitting unit 401. The transmitting unit 401 correlates the sensor node ID thereof with the registration signal and transmits the registration signal to a nearby sensor node 101. In the example depicted in FIG. 7, registration signals are transmitted from the sensor nodes 101-8, 12, 13, and 17.

The receiving unit 402 receives a reception signal from a nearby sensor node 101. More specifically, the receiving unit 402 receives the registration signal. The sensor nodes 101-0, 3, 7, and 9 receive the registration signal from the sensor node 101-8. The sensor nodes 101-0, 7, 11, and 16 receive the registration signal transmitted from the sensor node 101-12. The sensor nodes 101-0, 9, 14, and 18 receive the registration signal transmitted from the sensor node 101-13. The sensor nodes 101-0, 16, 18, 22 receive the registration signal transmitted from the sensor node 101-17.

Taking the sensor node 101-0 as an example, the registering unit 406-0 of the sensor node 101 does not register the identification information of the sensor node 101-8 since the registration signal has already been transmitted.

Taking the sensor node 101-7 as an example, 8 is registered as a toward-center_assignment-destination sensor node ID. The transmitting unit 401-7 correlates and transmits to a nearby sensor node 101, a reception signal, the sensor node ID of the transmission source of the registration signal corresponding to the reception signal, and the sensor node ID of the sensor node 101-7. The transmitting unit 401-7 transmits "(2, 0, 0), 8, 7".

The receiving unit 402 receives a reception signal from a nearby sensor node 101. For example, the receiving unit 402-8 receives a reception signal. Here, the sensor node ID of the transmission source of the registration signal that corresponds to the reception signal and the sensor node ID of the transmission source of the reception signal are transmitted together with the reception signal. As an away-from-center_assignment-destination sensor node ID, the registering unit 406 registers into the storage device 410, the identification information that indicates the sensor node 101 that is the transmission source of the reception-signal, the identification information being received together with the reception signal. If the sensor node ID of the transmission source of the registration signal that corresponds to the reception signal coincides with the sensor node ID of the registering unit 406-8, the registering unit 406-8 registers the sensor node ID of the transmission source of the reception signal, as an away-from-center_assignment-destination sensor node ID of the sensor node 101-8. As depicted in FIG. 7, 7 is registered as an away-from-center_assignment-destination sensor node ID of the sensor node 101-8. Thus, in this manner, by repeated sensor node 101 registration, when all of the sensor nodes 101 have finished transmitting a registration signal, the registration process ends.

The transmitting unit 401 transmits request information that includes the assignment-destination sensor node ID stored in the storage device 410 to a nearby sensor node 101. The request information is information that causes the data processing of the sensor node 101 of the transmitting unit 401 to be executed by an assignment-destination sensor node 101 and is information that causes execution results of the data processing to be transmitted to a sensor node near the assignment-destination sensor node 101.

Figure 8:
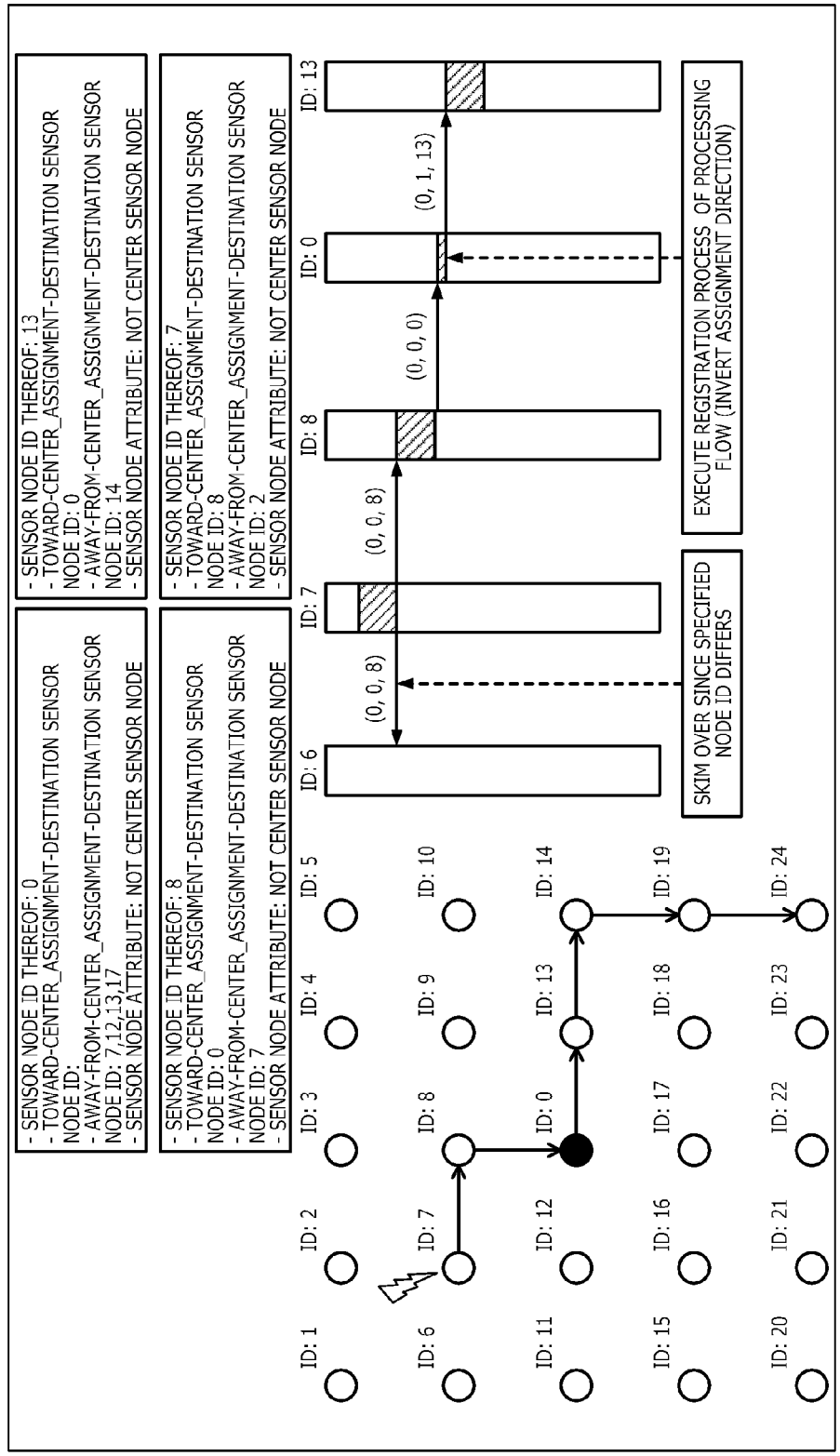
FIG. 8 is a diagram depicting an execution example of data processing by sensor nodes.

FIG. 8 is a diagram depicting an execution example of the data processing by the sensor nodes. For example, if the sensor node 101-7 cannot perform data processing corresponding to a sensor event, the sensor node 101-7 requests the sensor node 101 that is indicated by the assignment-destination sensor node ID stored in the storage device 410 to execute the data processing. For example, the sensor node 101-7 transmits to a nearby sensor node 101, "(0, 0, 8)" as the identification information of the transmission data, and information related to the data processing.

The receiving unit 402 receives request information from a nearby sensor node 101. Here, the received request information includes the identification information of the assignment-destination sensor node 101 stored in the storage device 410 of a given sensor node 101 other than that of the receiving unit 402. More specifically, the request information is information that requests the assignment-destination sensor node 101 to execute the data processing of the given sensor node 101 and to transmit the execution results of the data processing.

The judging unit 403 judges whether the sensor node 101 indicated by the request information received by the receiving unit 402 is the sensor node 101 of the judging unit 403. More specifically, for example, the judging unit 403 judges whether the assignment-destination sensor node ID included in the identification information at the head of received data is the sensor node ID of the sensor node 101 of the judging unit 403.

If the assignment-destination sensor node ID is judged by the judging unit 403 to be that of the sensor node 101 of the judging unit 403, the executing unit 404 executes data processing based on the received request information. On the other hand, if the assignment-destination sensor node ID is judged by the judging unit 403 to not be that of the sensor node 101 of the judging unit 403, the executing unit 404 refrains from executing data processing based on the received request information. As depicted in FIG. 8, for example, the sensor node 101-8 executes data processing based on the received request information. Meanwhile, the sensor node 101-6 refrains from executing data processing based on the received request information.

When the assignment-destination sensor node ID is judged by the judging unit 403 to be that of the sensor node 101 of the judging unit 403 and if the execution of data processing of the nearby sensor node 101 has been completed by the executing unit 404, the transmitting unit 401 transmits the execution results obtained by the executing unit 404 to a nearby sensor node 101. For example, the identification information of the transmission data transmitted by the transmitting unit 401 is assumed to be "(4, 0, 0)". In this case, execution results are communicated by multi-hop communication among the sensor nodes 101 and transmitted to the parent device 102.

Further, a case where the assignment-destination sensor node ID is judged by the judging unit 403 to be that of the sensor node 101 of the judging unit 403 will be described. If the execution of data processing of the nearby sensor node 101 has not been completed by the executing unit 404, the transmitting unit 401 transmits to a nearby sensor node 101, request information and the execution results of the data processing for which execution has been completed by the executing unit 404. The request information here is information that includes the assignment-destination sensor node ID stored in the storage device 410 and causes the data processing that is indicated by the received request information and for which execution was not completed by the executing unit 404 to be executed by the assignment-destination sensor node 101. Further, the request information is information that requests the assignment-destination sensor node 101 to transmit the execution results of the data processing by the assignment-destination sensor node 101.

Further, the receiving unit 402 receives request information and execution results of the data processing for which execution has been completed. Here, the request information is information that includes the assignment-destination sensor node ID stored in the storage device 410 of a sensor node 101 among the sensor nodes, other than the sensor node 101 of the receiving unit 402. The request information is information that requests the assignment-destination sensor node 101 to execute the data processing of a sensor node 101 among the sensor nodes 101, and for which execution has not been completed. The request information is information that requests the assignment-destination sensor node 101 to transmit the execution results of the data processing. For example, the identification information of the received data is "0, 0, i".

The judging unit 403 judges whether the assignment-destination sensor node 101 indicated by the identification information included in the request information received by the receiving unit 402 is the sensor node 101 of the judging unit 403.

If the assignment-destination sensor node 101 is judged by the judging unit 403 to be the sensor node 101 of the judging unit 403, the executing unit 404 executes data processing based on the received request information. If the assignment-destination sensor node 101 is judged by the judging unit 403 to not be the sensor node 101 of the judging unit 403, the executing unit 404 refrains from executing data processing based on the received request information.

Details in a case where the assignment-destination sensor node 101 is judged by the judging unit 403 to be the sensor node 101 of the judging unit 403 will be described. If the data processing executed based on the request information has been completed by the executing unit 404, the transmitting unit 401, for example, transmits execution results obtained by the executing unit 404 to a sensor node 101 near the sensor node 101 of the transmitting unit 401. If the data processing executed based on the request information is not completed by the executing unit 404, the transmitting unit 401 transmits to a nearby sensor node 101, request information that includes the assignment-destination sensor node ID stored in the storage device 410 and execution results of the data processing that has been completed. The execution results of the data processing that has been completed includes the execution results received by the receiving unit 402, and the execution results of the portion of data processing completed by the executing unit 404 based on the received request information. The request information transmitted here is information requesting the execution of data processing not completed by the executing unit 404 and based on the received request information, and requesting the transmission of execution results of the data processing.

Further, for example, a case where execution is not completed may be a case where the battery 208 is insufficient for execution of the data processing. Thus, the executing unit 404 executes the data processing based on the received request information until execution of the data processing is completed, or until the level of electrical power stored by the power storage unit 407 becomes less than a given value. More specifically, the determining unit 405 determines whether the level of electrical power stored by the power storage unit 407 is less than a given value. The determining unit 405, for example, may be realized by the PMU 209. The executing unit 404 executes the data processing based on the received request information until the execution of the data processing is completed, or until the level of stored electrical power has been determined to be less than the given value by the determining unit 405.

Figure 9:
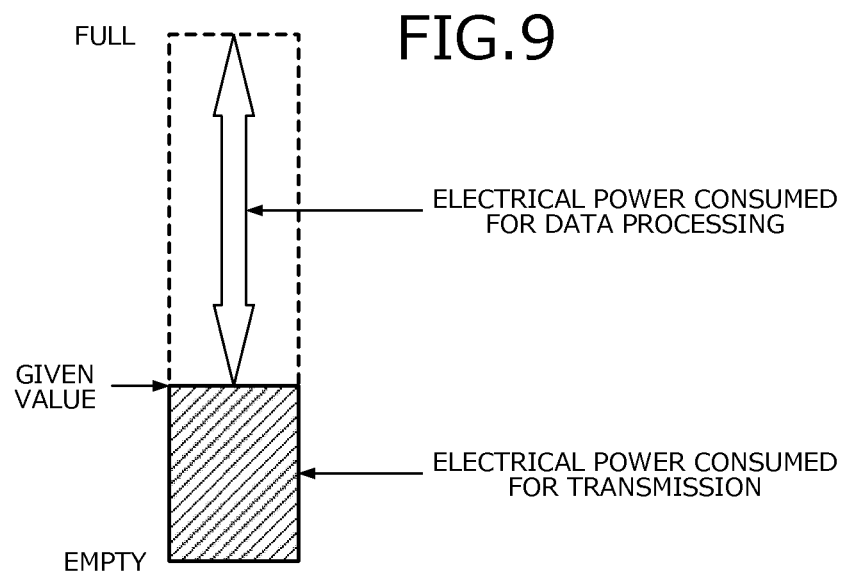
FIG. 9 is a diagram depicting one example of a given value according to a first example.

FIG. 9 is a diagram depicting one example of the given value according to the first example. For example, if it is desirable for the sensor node 101 to continue operation after transmission of execution results and/or request information, the given value may be an amount that is greater than the amount of electrical power consumed for one transmission of data such as execution results and request information. For example, if the sensor node 101 may terminate operation after transmitting execution results and/or request information, the given value may be the amount of electrical power consumed for one transmission. The given value, for example, is set by the developer of the sensor network system 100. The given value, for example, is stored to the storage device 410 such as the RAM 204, the ROM 203, etc. in advance.

Until execution of the data processing based on the request information is complete, the executing unit 404 executes the data processing as long as the level of stored electrical power is determined to not be less than the given value by the determining unit 405. As described above, the determining unit 405 determines whether the level of stored electrical power is less than the given value.

If the level of stored electrical power is determined by the determining unit 405 to be less than the given value, the transmitting unit 401 transmits to a nearby sensor node 101, the execution results of the completed data processing that is based on the received request information, and new request information. Here, the new request information is information that includes the assignment-destination sensor node ID stored in the storage device 410, and requests the execution of the data processing not completed by executing unit 404 and the transmission of the execution results of the data processing.

The receiving unit 402 of the center sensor node 101 receives the request information. The judging unit 403 judges whether the sensor node 101 indicated by the identification information included in the received request information is that of the sensor node 101 of the judging unit 403.

If the indicated sensor node 101 is judged by the judging unit 403 to be the sensor node 101 thereof, the transmitting unit 401 of the center sensor node 101 transmits to a nearby sensor node 101, request information that includes the assignment-destination sensor node ID stored in the storage device 410. Here, the request information is information that requests the assignment-destination sensor node 101 to execute the data processing indicated by the received request information and to transmit execution results of the data processing. If execution of the data processing is not completed by the assignment-destination sensor node 101, the transmitting unit 401 transmits to a nearby sensor node 101, information that causes a sensor node 101 that is not between the assignment-destination sensor node 101 and the center sensor node 101 to execute the data processing. Information that causes a sensor node 101 that is not between the assignment-destination sensor node 101 and the center sensor node 101 to execute the data processing, for example, is information in which the assignment direction in the identification information of the transmission data is set in a direction away from the center. The identification information of the transmission data is assumed to be "(0, 1, i)".

The receiving unit 402 receives from a nearby sensor node 101, request information that includes the assignment-destination sensor node ID stored in the storage device 410 of a sensor node 101 that is among the sensor nodes 101 and exclusive of the sensor node 101 of the receiving unit 402. Here, the request information is information that requests the assignment-destination sensor node 101 to execute the data processing and to transmit execution results of the data processing. Further, the receiving unit 402 receives together with the request information, information that causes a sensor node 101 that is not between the assignment-destination sensor node 101 and the center sensor node 101 to execute the data processing if the execution of the data processing is not completed by the assignment-destination sensor node 101. As described above, the identification information of the data received by the receiving unit 402 is "(0, 1, i)".

The judging unit 403 judges whether the sensor node 101 indicated by the identification information included in the received request information is the sensor node 101 of the judging unit 403. If the indicated sensor node 101 is judged by the judging unit 403 to be that of the judging unit 403, the executing unit 404 executes the data processing based on the received request information. On the other hand, if the identified sensor node 101 is judged by the judging unit 403 to not be that of the judging unit 403, the executing unit 404 refrains from executing the data processing based on the received request information.

If the execution of the data processing indicated by the request information has not been completed, the transmitting unit 401 transmits request information that includes the away-from-center_assignment-destination sensor node ID stored in the storage device 410. Here, the request information is information requesting the assignment-destination sensor node 101 to execute the data processing for which execution has not been completed and to transmit execution results of the data processing. Further, the transmitting unit 401 transmits together with the request information, information that causes the data processing to be executed by another assignment-destination sensor node 101 in a direction away from the center sensor node 101, if the execution of the data processing is not completed by the assignment-destination sensor node 101. The transmitting unit 401 further transmits with the request information to be transmitted, the execution results of the completed data processing based on the received request information.

Figure 10:
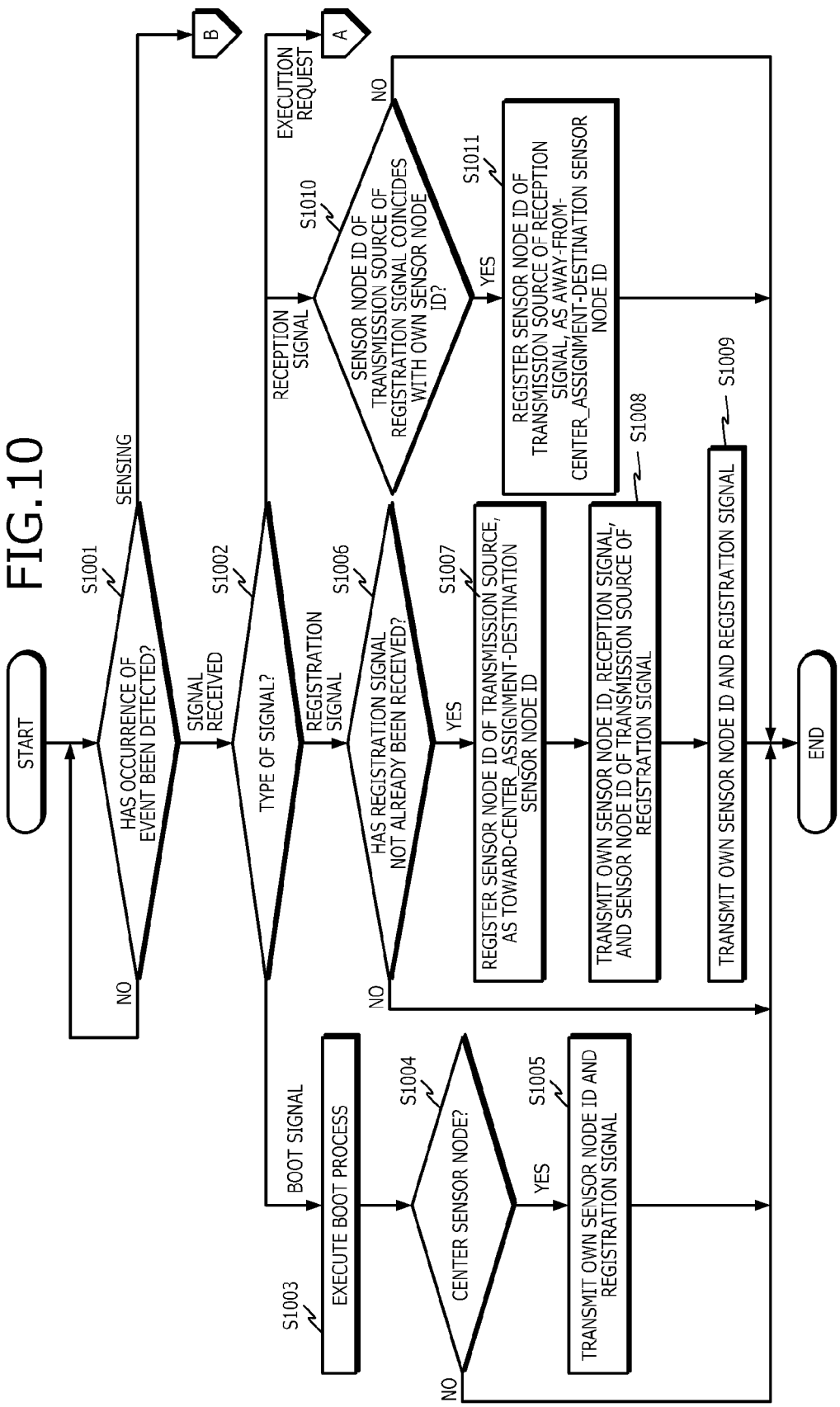
FIG. 10 is a flowchart (part 1) depicting an example of a procedure of a process performed by the sensor node according to the first example.
Figure 11:
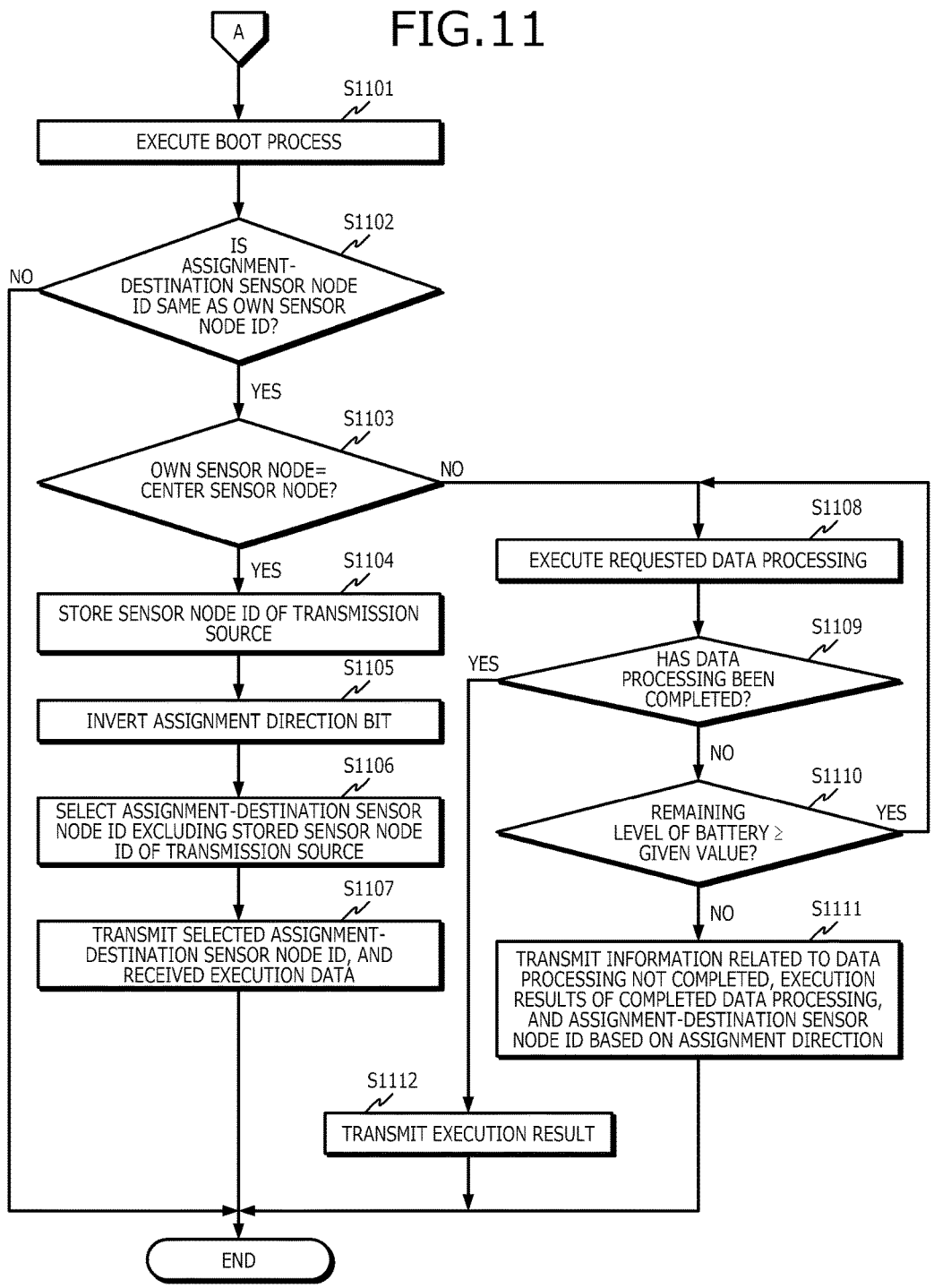
FIG. 11 is a flowchart (part 2) depicting an example of a procedure of a process performed by the sensor node according to the first example.
Figure 12:
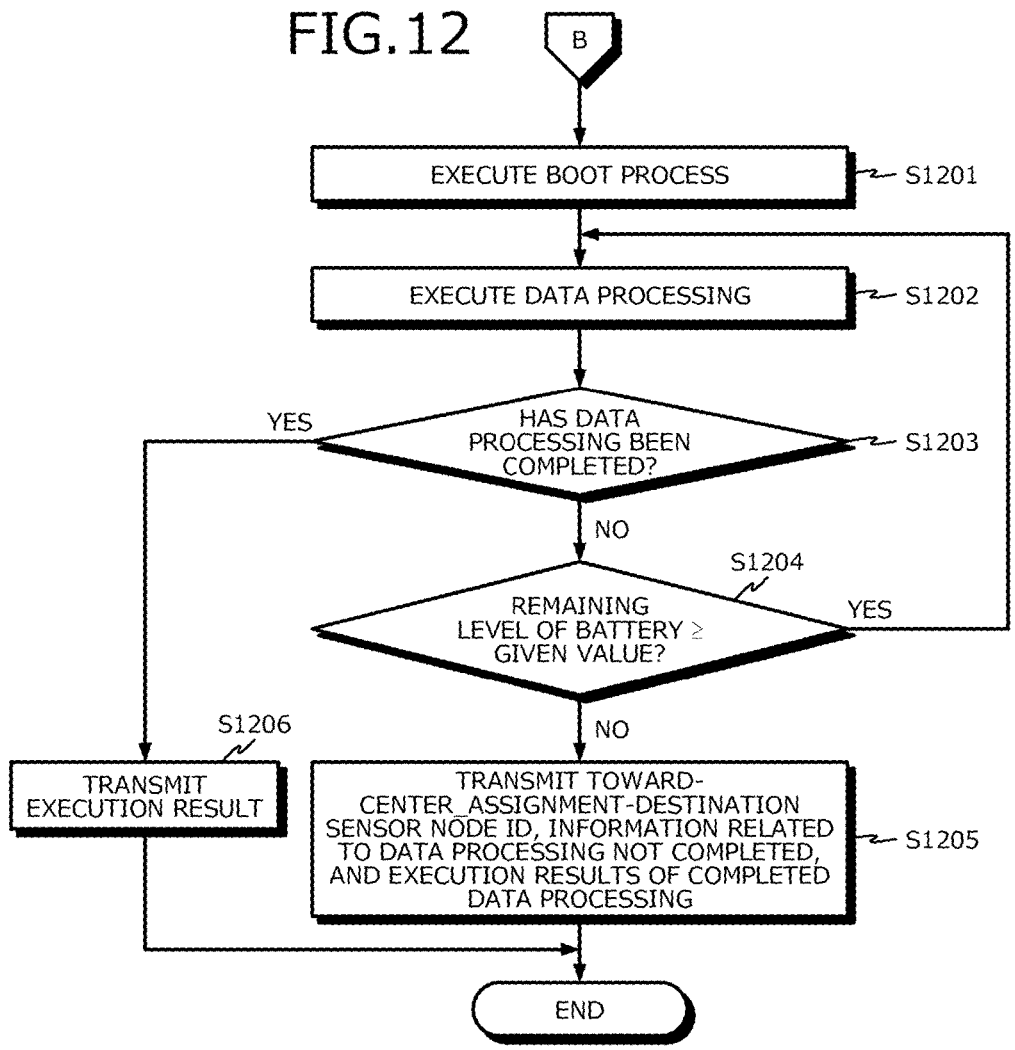
FIG. 12 is a flowchart (part 3) depicting an example of a procedure of a process performed by the sensor node according to the first example.

FIGS. 10, 11, and 12 are flowcharts depicting an example of a procedure of a process performed by the sensor node according to the first example. The sensor node 101 judges whether the occurrence of an event has been detected (step S1001). If no event has been detected (step S1001: NO), the sensor node 101 returns to step S1001.

If a signal has been received (step S1001: signal received), the sensor node 101 judges the type of the signal (step S1002). If the received signal is a boot signal from the parent device 102 (step S1002: boot signal), the sensor node 101 executes a boot process (step S1003), and judges whether the sensor node 101 is the center sensor node 101 (step S1004). Whether the sensor node 101 is the center sensor node 101 is determined by the attribute of the sensor node 101, stored in the storage device 410. If the sensor node 101 is the center sensor node 101 (step S1004: YES), the sensor node 101 transmits the sensor node ID thereof and a registration signal to a nearby sensor node 101 (step S1005), and ends the series of operations. On the other hand, if the sensor node 101 is not the center sensor node 101 (step S1004: NO), the sensor node 101 ends the series of operations.

At step S1002, if the received signal is a registration signal (step S1002: registration signal), the sensor node 101 judges whether the registration signal has not already been received (step S1006). By step S1006, whether the sensor node ID of a transmission destination toward the center has already been registered in the storage device 410 is judged.

If the registration signal has not already been received (step S1006: YES), the sensor node 101 registers, as a toward-center_assignment-destination sensor node ID, the sensor node ID of the transmission source of the registration signal (step S1007). The sensor node 101 transmits the sensor node ID thereof, a reception signal, and the sensor node ID of the transmission source of the registration signal to a nearby sensor node 101 (step S1008). The sensor node 101 transmits the sensor node ID thereof and a registration signal to a nearby sensor node 101 (step S1009), and ends the series of operations. If the registration signal has already been received (step S1006: NO), the sensor node ID of the transmission source toward the center has already been registered in the storage device 410 and therefore, the sensor node 101 ends the series of operations.

At step S1002, if the received signal is a reception signal (step S1002: reception signal), the sensor node 101 transitions to step S1010. The sensor node 101 judges whether the sensor node ID of the transmission source of the registration signal that corresponds to the reception signal coincides with that of the sensor node 101 (step S1010). If the sensor node ID of the transmission source of the registration signal does not coincide with that of the sensor node 101 (step S1010: NO), the sensor node 101 ends the series of operations. If the sensor node ID of the transmission source of the registration signal coincides with the sensor node ID of the sensor node 101 (step S1010: YES), the sensor node 101 transitions to step S1011. The sensor node 101 registers, as an away-from-center_assignment-destination sensor node ID, the sensor node ID of the transmission source of the reception signal (step S1011), and ends the series of operations.

At step S1002, if the received signal is an execution request (step S1002: execution request), the sensor node 101 executes the boot process (step S1101). The sensor node 101 judges whether the assignment-destination sensor node ID included in the execution request is the same as the sensor node ID of the sensor node 101 (step S1102). If the sensor node ID is not the same as the sensor node ID of the sensor node 101 (step S1102: NO), the sensor node 101 ends the series of operations. If the sensor node ID is the same as the sensor node ID of the sensor node 101 (step S1102: YES), the sensor node 101 judges whether the sensor node 101 is the center sensor node 101 (step S1103). Whether the sensor node 101 is the center sensor node 101 is determined by the attribute of the sensor node 101, stored in the storage device 410.

If the sensor node 101 is the center sensor node 101 (step S1103: YES), the sensor node 101 stores the sensor node ID of the transmission source of the execution request (step S1104), and inverts the assignment direction bit (step S1105). Among assignment-destination sensor node IDs that are based on the assignment direction after inversion and stored in the storage device 410, the sensor node 101 selects an assignment-destination sensor node ID excluding the stored sensor node ID of the transmission source (step S1106). The sensor node 101 transmits the selected assignment-destination sensor node ID, and the received execution data as an execution request (step S1107), and ends the series of operations.

At step S1103, if the sensor node 101 is not the center sensor node 101 (step S1103: NO), the sensor node 101 executes the requested data processing (step S1108), and judges whether the data processing has been completed (step S1109). If the data processing has not been completed (step S1109: NO), the sensor node 101 judges if the remaining level of the battery 208 is a given value or greater (step S1110). An example of the given value is depicted in FIG. 9.

If the remaining level is the given value or greater (step S1110: YES), the sensor node 101 returns to step S1108. If the remaining level is less than the given value (step S1110: NO), the sensor node 101 transmits information related to the data processing for which execution has not been completed, the execution results of the data processing for which execution has been completed, and the assignment-destination sensor node ID based on the assignment direction (step S1111), and ends the series of operations. On the other hand, at step S1109, if the data processing has been completed (step S1109: YES), the sensor node 101 transmits execution results to a nearby sensor node 101 (step S1112), and ends the series of operations. The execution results are ultimately received by the parent device 102 by multi-hop communication.

At step S1001, if a sensing event has been detected (step S1001: sensing), the sensor node 101 executes the boot process (step S1201), and executes data processing (step S1202). The sensor node 101 judges whether the data processing has been completed (step S1203). If the data processing has been completed (step S1203: YES), the sensor node 101 transmits the execution results (step S1206), and ends the series of operations.

If the data processing has not been completed (step S1203: NO), the sensor node 101 determines if the remaining level of the battery 208 is a given value or greater (step S1204). If the remaining level of the battery 208 is the given value or greater (step S1204: YES), the sensor node 101 returns to step S1202. If the remaining level of the battery 208 is less than the given value (step S1204: NO), the sensor node 101 transmits a toward-center_assignment-destination sensor node ID, information related to the data processing that has not been completed, and the execution results of the data processing that has been completed (step S1205), and ends the series of operations.

In the second example, when among the sensor nodes 101, an execution request for the data processing is assigned to a terminal sensor node 101 in the given area A, there is no subsequent request-destination and therefore, the execution request for the data processing is assigned to loop back. As a result, the execution of the data processing can be completed.

Further, if the receiving unit 402 can receive a reception signal within a given period, the registering unit 406 stores to the storage device 410, the sensor node ID of the transmission source of the registration signal, as an away-from-center_assignment-destination sensor node ID. For example, among the sensor nodes 101, a sensor node 101 that is arranged at an edge of the given area A has no request-destination for the registration signal and therefore, has a high possibility of not being able to receive a reception signal within the given period. Thus, for example, if the away-from-center_assignment-destination sensor node ID and the toward-center_assignment-destination sensor node ID are the same, the sensor node 101 can judge that the sensor node 101 is a sensor node arranged at an edge.

Figure 13:
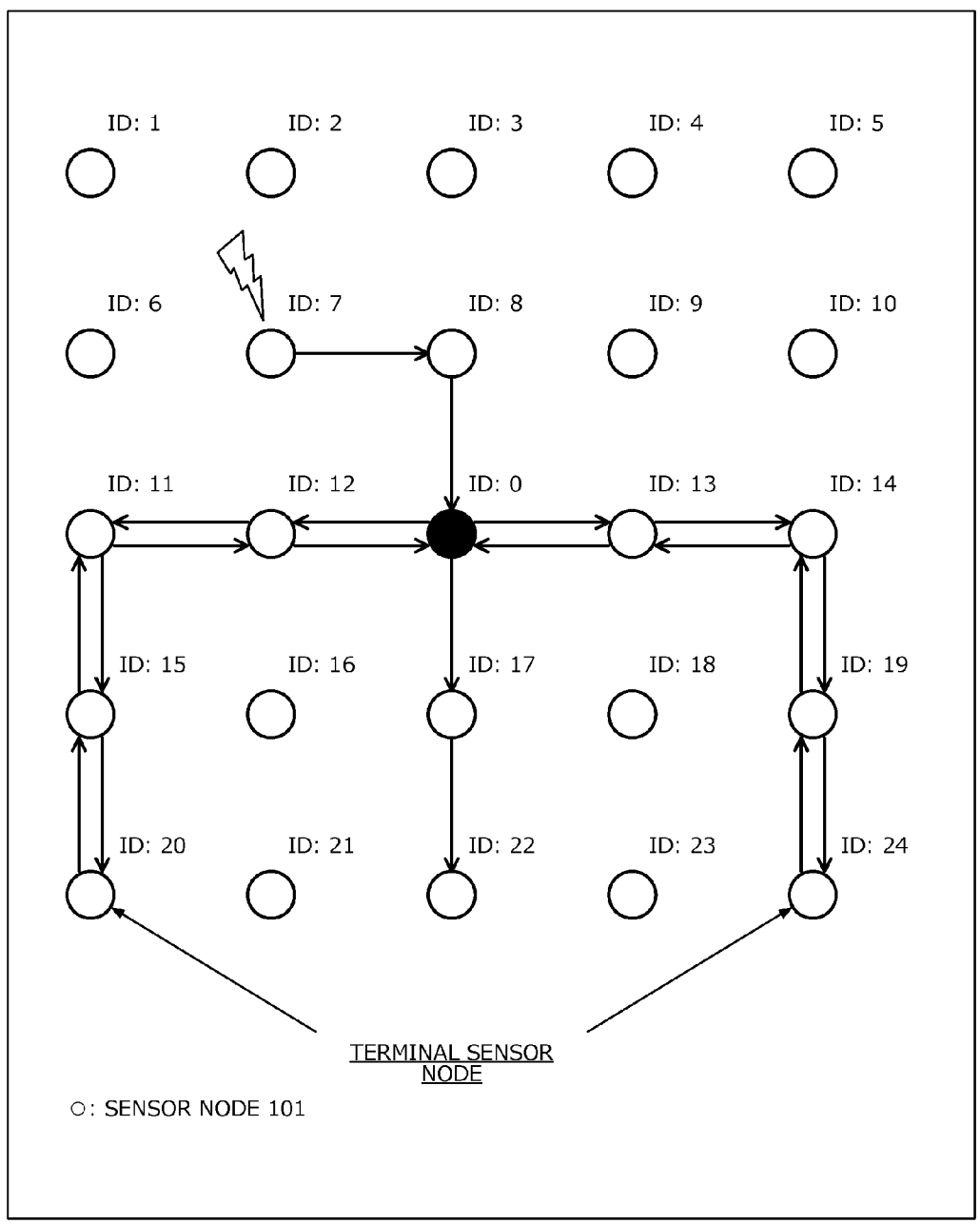
FIG. 13 is a diagram depicting an example of a request for execution of data processing according to a second example.

FIG. 13 is a diagram depicting an example of a request for the execution of data processing according to the second example. As depicted in FIG. 13, by repeatedly requesting execution of the data processing in a direction away from the center, the execution request may reach a sensor node 101 at an edge. In this case, the terminal sensor node 101 having no request-destination, requests execution of the data processing in direction toward the center. As a result, execution can be continued to be requested until the data processing is completed.

The receiving unit 402 receives from a nearby sensor node 101, request information, and information causing the data processing to be executed by a sensor node 101 that is not between the assignment-destination sensor node 101 and the center sensor node 101, if the data processing has not been completed. Here, the request information is information that includes the assignment-destination sensor node ID stored in the storage device 410 of a sensor node 101 other than the sensor node 101 of the receiving unit 402, and that requests the assignment-destination sensor node 101 to execute the data processing and to transmit the execution results of the data processing.

The judging unit 403 judges whether the assignment-destination sensor node ID included in the received request information is the sensor node ID of the sensor node 101 of the judging unit 403.

If the sensor node ID is that of the sensor node 101 of the executing unit 404, the executing unit 404 executes the data processing that is based on the received request information; and if the sensor node ID is judged by the judging unit 403 to not be that if the sensor node 101 of the judging unit 403, the executing unit 404 refrains from executing the data processing that is based on the received request information.

Figure 14:
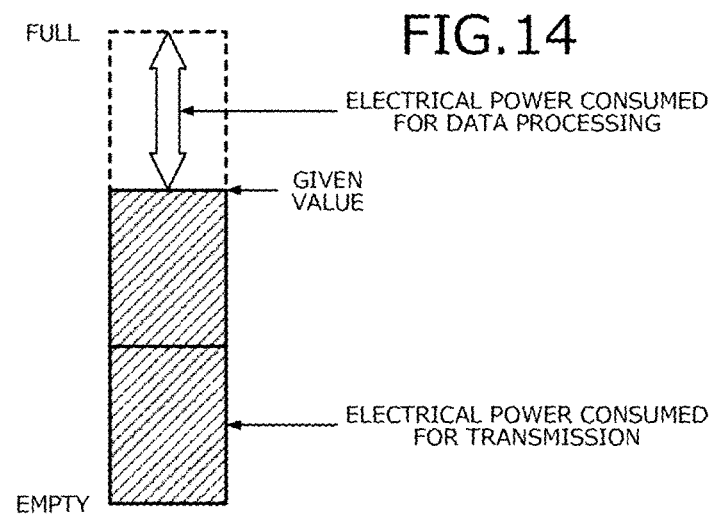
FIG. 14 is a diagram depicting an example of the given value according to the second example.

FIG. 14 is a diagram depicting an example of the given value according to the second example. Here, the given value used when a determination is made by the determining unit 405 in the second example will be described. In the second example, an execution request for the data processing is looped back toward the center by the terminal sensor node 101. Thus, the given value is an electrical power amount consumed for at least two transmissions. The given value, for example, is set by the developer of the sensor network system 100. The given value, for example, is stored to the storage device 410 such as the RAM 204, the ROM 203, etc. in advance.

If execution of the data processing indicated by the request information has not been completed and if two assignment-destination sensor node IDs stored in the storage device 410 are the same, the transmitting unit 401 transmits request information that includes the assignment-destination sensor node ID stored in the storage device 410. Further, if the execution of the data processing has not been completed, the transmitting unit 401 transmits to a nearby sensor node 101, information causing the toward-center_assignment-destination sensor node 101 to execute the data processing, and execution results of the data processing that is based on the received request information and has been completed.

Figure 15:
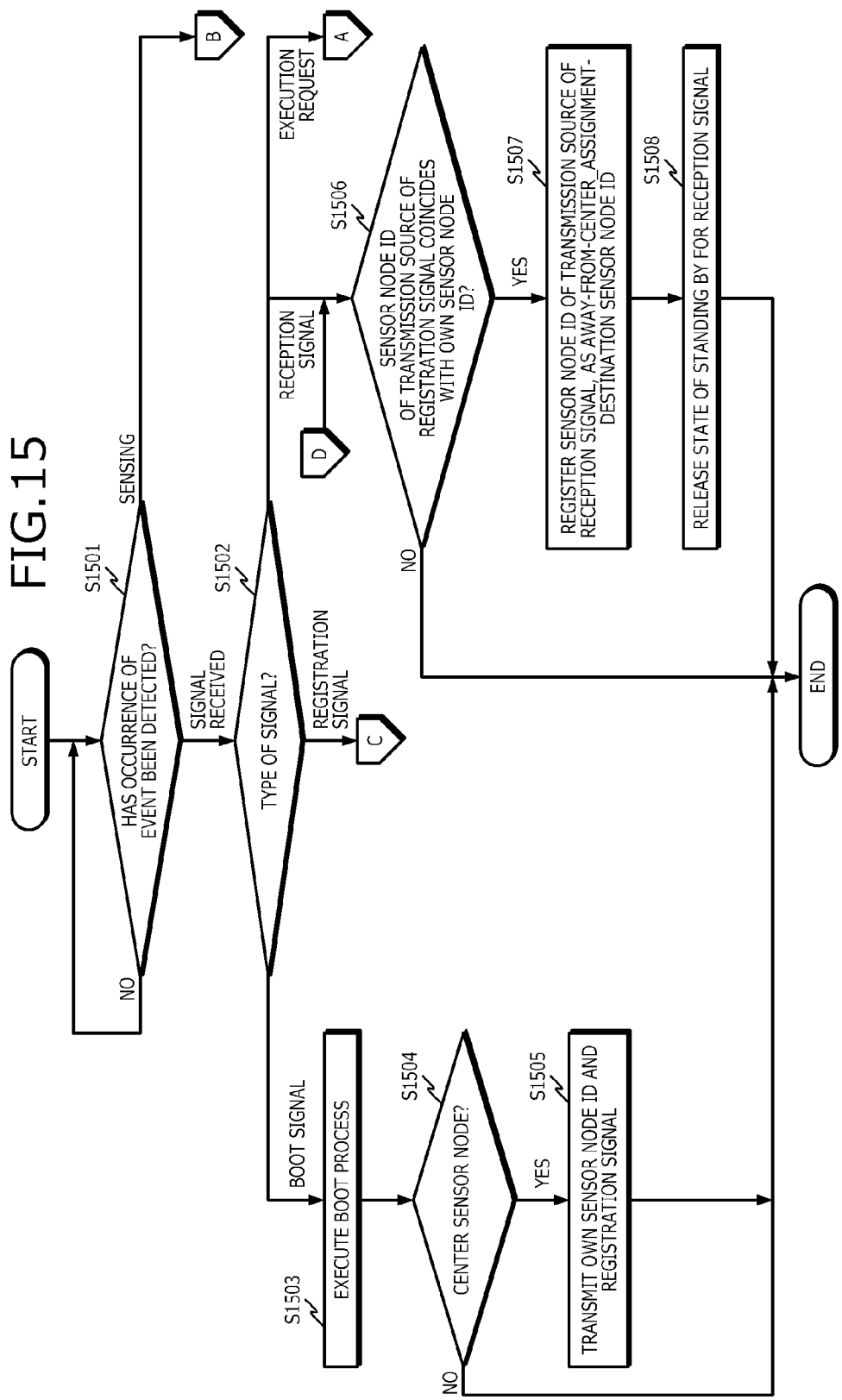
FIG. 15 is a flowchart (part 1) depicting an example of a procedure of a process performed by the sensor node according to the second example.

FIGS. 15, 16, and 17 are flowcharts depicting an example of a procedure of a process performed by the sensor node according to the second example. The sensor node 101 judges whether the occurrence of an event has been detected (step S1501). If no event has been detected (step S1501: NO), the sensor node 101 returns to step S1501.

If a signal has been received (step S1501: signal received), the sensor node 101 judges the type of the signal (step S1502). If the received signal is a boot signal from the parent device 102 (step S1502: boot signal), the sensor node 101 executes the boot process (step S1503), and judges whether the sensor node 101 is the center sensor node 101 (step S1504). Whether the sensor node 101 is the center sensor node 101 is determined by the attribute of the sensor node 101, stored in the storage device 410. If the sensor node 101 is the center sensor node 101 (step S1504: YES), the sensor node 101 transmits the sensor node ID thereof and a registration signal to a nearby sensor node 101 (step S1505), and ends the series of operations. On the other hand, if the sensor node 101 is not the center sensor node 101 (step S1504: NO), the sensor node 101 ends the series of operations.

At step S1502, if the received signal is a registration signal (step S1502: registration signal), the sensor node 101 judges whether the registration signal has already been received (step S1601). By step S1601, whether the sensor node ID of a transmission destination toward the center has already been registered in the storage device 410 is judged.

If the registration signal has not already been received (step S1601: YES), the sensor node 101 registers, as a toward-center_assignment-destination sensor node ID, the sensor node ID of the transmission source of the registration signal (step S1602). The sensor node 101 transmits the sensor node ID thereof, a reception signal, and the sensor node ID of the transmission source of the registration signal (step S1603). The sensor node 101 transmits the sensor node ID thereof and a registration signal to a nearby sensor node 101 (step S1604), and transitions to a state of standing by to receive a reception signal (step S1605).

The sensor node 101 judges whether a reception signal is received within a given period after the registration signal is transmitted (step S1606). If a reception signal is received within the given period (step S1606: YES), the sensor node 101 transitions to step S1506. If no reception signal is received within the given period (step S1606: NO), the sensor node 101 copies a registered toward-center_assignment-destination sensor node 101, to an assignment-destination sensor node 101 in a direction away from the center (step S1607). The sensor node 101 releases the state of standing by to receive a reception signal (step S1608), and ends the series of operations. Further, if the registration signal has already been received (step S1601: NO), the sensor node ID of a transmission destination in a direction toward the center has already been stored in the storage device 410 and therefore, the sensor node 101 ends the series of operations.

At step S1502, if the received signal is a reception signal (step S1502: reception signal), the sensor node 101 transitions to step S1506. The sensor node 101 judges whether the sensor node ID of the transmission source of the registration signal that corresponds to the reception signal coincides with the sensor node ID of the sensor node 101 (step S1506). If the sensor node ID of the transmission source of the registration signal coincides with the sensor node ID of the sensor node 101 (step S1506: NO), the sensor node 101 ends the series of operations.

If the sensor node ID of the transmission source of the registration signal that corresponds to the reception signal coincides with the sensor node ID of the sensor node 101 (step S1506: YES), the sensor node 101 transitions to step S1507. The sensor node 101 registers the sensor node ID of the transmission source of the reception signal, as an away-from-center_assignment-destination sensor node ID (step S1507). The sensor node 101 releases the state of standing by to receive a reception signal (step S1508), and ends the series of operations.

At step S1502, if the received signal is an execution request (step S1502: execution request), the sensor node 101 executes the boot process (step S1701). The sensor node 101 determines whether the assignment-destination sensor node ID included in the execution request is the same as the sensor node ID of the sensor node 101 (step S1702). If the included sensor node ID is not the same as that of the sensor node 101 (step S1702: NO), the sensor node 101 ends the series of operations. If the included sensor node ID is the same as that of the sensor node 101 (step S1702: YES), the sensor node 101 determines whether the sensor node 101 is the center sensor node 101 (step S1703). Whether the sensor node 101 is the center sensor node 101 is determined by the attribute of the sensor node 101, stored in the storage device 410.

If the sensor node 101 is the center sensor node 101 (step S1703: YES), the sensor node 101 stores the sensor node ID of the transmission source of the execution request (step S1704), and inverts the assignment direction bit (step S1705). Among assignment-destination sensor node IDs that are based on the assignment direction after inversion and stored in the storage device 410, the sensor node 101 selects an assignment-destination sensor node ID excluding the stored sensor node ID of the transmission source (step S1706). The sensor node 101 transmits the selected assignment-destination sensor node ID, and the received execution data as an execution request (step S1707), and ends the series of operations.

At step S1703, if the sensor node 101 is not the center sensor node 101 (step S1703: NO), the sensor node 101 executes the requested data processing (step S1708), and judges whether the data processing has been completed (step S1709). If the data processing has not been completed (step S1709: NO), the sensor node 101 judges if the remaining level of the battery 208 is a given value or greater (step S1710). An example of the given value is depicted in FIG. 14.

If the remaining level is the given value or greater (step S1710: YES), the sensor node 101 returns to step S1708. If the remaining level is less than the given value (step S1710: NO), the sensor node 101 judges whether the toward-center_assignment-destination sensor node ID and the away-from-center_assignment-destination sensor node ID are the same (step S1711). If the toward-center_assignment-destination sensor node ID and the away-from-center_assignment-destination sensor node ID are not the same (step S1711: NO), the sensor node 101 transitions to step S1713.

If the toward-center_assignment-destination sensor node ID and the away-from-center_assignment-destination sensor node ID are the same (step S1711: YES), the sensor node 101 inverts the assignment direction bit (step S1712). The sensor node 101 transmits information related to the data processing has not been completed, the execution results for the data processing that has been completed, and an assignment-destination sensor node ID based on the assignment direction (step S1713), and ends the series of operations. On the other hand, at step S1709, if the data processing has been completed (step S1709: YES), the sensor node 101 transmits the execution results to a nearby sensor node 101 (step S1714), and ends the series of operations.

At step S1501, if a sensing event has been detected (step S1501: sensing), the operations are the same as those of the first example depicted in FIG. 12 and therefore, detailed description thereof is omitted.

As described in the first example and the second example, the sensor node requests the execution of data processing to a sensor node that requires plural hops to communicate with the parent device. Even if the data processing is not completed by the assignment-destination sensor node, execution of the data processing can be continued by another sensor node and therefore, the data processing can be executed in stages until reaching the parent device. Therefore, the degree of certainty that complete processing results reach the parent device can be improved.

Further, if the assignment-destination sensor node ID included in the request information received by a sensor node is the sensor node ID of the sensor node, the sensor node executes the data processing indicated by the received request information. If the sensor node does not complete executing the data processing indicated by the received request information, the sensor node requests an assignment-destination sensor node indicated by the identification information stored in the storage device of the sensor node, to continue the data processing. As a result, the data processing is executed in stages by plural sensor nodes until execution of the data processing has been completed. Therefore, the degree of certainty that complete processing results reach the parent device can be improved.

Further, in a case where the remaining level of the battery is insufficient, the sensor node suspends the execution of the data processing, and requests the assignment-destination sensor node indicated by the identification information stored in the storage device to continue executing the data processing. As a result, if the data processing is executed in stages by plural sensor nodes, the execution of the data processing can be prevented from being abandoned consequent to the battery becoming exhausted.

Further, among sensor nodes requiring plural hops in communicating with the parent device, the sensor node can request a sensor node with which direct communication is possible, to continue executing the data processing. Since the request-destination is requested to execute the data processing, sensor nodes that are not the request-destination need not perform a process of transferring information related to the data processing and therefore, the data processing can be completed by plural sensor nodes, without increasing the load on the sensor nodes.

Further, a first assignment-destination sensor node ID of a sensor node that is between a given sensor node and the center sensor node, and a second assignment-destination sensor node ID of a sensor node that is not between the given sensor node the center sensor node are stored in the storage device. When a sensor node first requests another sensor node to execute data processing, a first assignment-destination sensor node is requested to execute the data processing. If the execution request for the data processing reaches the center sensor node, the center sensor node requests a first assignment-destination sensor node that is away from the center sensor node to execute the data processing. As a result, the data processing can be continued to be executed by plural sensor nodes, without execution of the data processing being abandoned. Therefore, the degree of certainty that complete processing results will reach the parent device can be improved.

Further, a registration signal transmitted by the center sensor node is transferred by plural sensor nodes. When a sensor node receives the registration signal, the sensor node stores the sensor node ID of the transmission source of the registration signal as the first assignment-destination sensor node ID. The sensor node transmits to a nearby sensor node, a reception signal indicating that the first assignment-destination sensor node ID of the registration signal has been registered. If the sensor node ID of the transmission source of the registration signal that corresponds to the received reception signal is the sensor node ID of the sensor node, the sensor node stores the sensor node ID of the transmission source of the reception signal as the second assignment-destination sensor node ID. As a result, assignment of a sensor node toward the center is enabled, and assignment of a sensor node away from the center is enabled.

If a sensor node arranged at an edge of the given area has no request-destination, the sensor node requests the request source to execute the data processing. As a result, the abandonment of data processing by a sensor node arranged at an edge can be prevented. Since the data processing is continued by plural sensor nodes, the degree of certainty that complete processing results will be reach the parent device can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A given communications apparatus included in a plurality of first communications apparatuses, among which at least execution results of data processing of the given communications apparatus is communicated by multi-hop communication whereby, the execution results are transmitted to a second communications apparatus that performs a process based on the execution results, the given communications apparatus comprising:
   a storage device storing therein identification information of a specified communications apparatus that requires plural hops to communicate with the second communications apparatus and is among the plurality of first communications apparatuses, exclusive of the given communications apparatus; and
   a wireless communications circuit that transmits to a nearby communications apparatus of the given communications apparatus, request information that includes the identification information stored in the storage device and that requests the specified communications apparatus to execute the data processing of the given communications apparatus and to transmit execution results of the data processing, wherein:
   the wireless communications circuit receives from the nearby communications apparatus of the given communications apparatus, request information that includes identification information that is of an assignment-destination communications apparatus and stored in a storage device of a communications apparatus that is among the plurality of first communications apparatuses, exclusive of the given communications apparatus, the request information further requesting the assignment-destination communications apparatus to execute data processing of the communications apparatus and to transmit execution results of the data processing of the communications apparatus,
   the given communications apparatus further comprises
      a processor that judges whether the assignment-destination communications apparatus indicated by the identification information included in the request information received by the wireless communications circuit is the given communications apparatus; and
      upon judging that the assignment-destination communications apparatus is the given communications apparatus, the processor executes the data processing that is based on the received request information, and upon judging that the assignment-destination communications apparatus is not the given communications apparatus, the processor refrains from executing the data processing that is based on the received request information, wherein
   the wireless communications circuit:
      when the processor judges that the assignment-destination communications apparatus is the given communications apparatus and the processor completes the data processing that is based on the received request information, transmits execution results obtained by the processor to the nearby communications apparatus of the given communications apparatus, and
      when the processor does not complete the data process that is based on the received request information, correlates and transmits to the nearby communications apparatus of the given communications apparatus, request information that includes the identification information stored in the storage device and the execution results of the data processing completed by the processor, the request information further requesting the specified communications apparatus to execute the data processing that is based on the received request information and not completed by the processor and the request information further requesting the specified communications apparatus to transmit execution results of the data processing.

2. The given communications apparatus according to claim 1, wherein
   the wireless communications circuit receives request information that includes identification information that is of an assignment-destination communications apparatus and stored in a storage device of a communications apparatus that is among the plurality of first communications apparatuses, exclusive of the given communications apparatus, and receives execution results of the data processing that has been completed, the request information further requesting the assignment-destination communications apparatus to execute the data processing that is of the communications apparatus and has not been completed and to transmit execution results of the data processing of the communications apparatus,
   the processor judges whether the assignment-destination communications apparatus indicated by the identification information included in the request information received by the wireless communications circuit is the given communications apparatus,
   the processor, upon judging that the assignment-destination communications apparatus is the given communications apparatus, executes the data processing that is based on the received request information, and upon judging that the assignment-destination communications apparatus is not the given communications apparatus, refrains from executing the data processing that is based on the received request information,
   the wireless communications circuit:
      when the processor judges that the assignment-destination communications apparatus is the given communications apparatus and when the processor completes the data processing that is based on the received request information, transmits execution results obtained by the processor to the nearby communications apparatus of the given communications apparatus, and
      when the processor does not complete the data processing that is based on the request information, transmits to the nearby communications apparatus of the given communications apparatus, request information that includes the identification information stored in the storage device, requests execution of the data processing that is based on the received request information and not completed by the processor, and requests transmission of execution results of the data processing, and further transmits execution results received by the wireless communications circuit and execution results of the data processing that is based on the received request information and that has been completed by the processor.

3. The given communications apparatus according to claim 1, further comprising a battery that stores electrical power supplied to the processor and the wireless communications circuit, wherein the processor executes the data processing that is based on the received request information until execution of the data processing is completed, or until a level of the electrical power stored by the battery becomes less than a given value, and the wireless communications circuit, when the level of stored electrical power becomes less than the given value and the data processing that is based on the received request information and executed by the processor is suspended, transmits to the nearby communications apparatus of the given communications apparatus, request information that includes the identification information stored in the storage device, requests execution of the data processing that is based on the received request information and that has not been completed by the processor, and requests transmission of execution results of the data processing, and further transmits the execution results of the data processing completed by the processor.

4. The given communications apparatus according to claim 1, wherein the specified communications apparatus is a communications apparatus with which the given communications apparatus can communicate directly.

5. The given communications apparatus according to claim 1, wherein;

the storage device of each communication apparatus of the plurality of first communications apparatuses:

when the second communications apparatus is provided in plural, stores first identification information of a first specified communications apparatus that is between the communication apparatus and a given communications apparatus that is among the plurality of first communications apparatuses and requires plural hops in communicating with each second communications apparatus, and second identification information of a second specified communications apparatus that is not between the communications apparatus and the given communications apparatus, each communication apparatus of the plurality of first communications apparatuses:

transmits to a nearby communications apparatus of the communications apparatus, request information that includes the first identification information stored in the storage device and that requests the first specified communications apparatus to execute data processing of the communications apparatus and to transmit execution results of the data processing, the given communications apparatus:

receives the request information, judges whether a communications apparatus indicated by identification information included in the received request information is the given communications apparatus, upon judging that the indicated communications apparatus is the given communications apparatus, transmits to the nearby communications apparatus of the given communications apparatus, request information that includes any one among the first identification information and the second identification information stored in the storage device, and requests any one among the first specified communications apparatus and the second specified communications apparatus to execute the data processing indicated by the received request information and to transmit execution results of the data processing, and when the data processing is not completed by the requested one among the first specified communications apparatus and the second specified communications apparatus, transmits information that causes the data processing to be executed by a communications apparatus that is not between the given communications and, the first specified communications apparatus or the second specified communications apparatus, each communications apparatus of the plurality of first communications apparatuses:

receives request information that includes identification information that is of an assignment-destination communications apparatus and stored in a storage device of another communications device among the plurality of first communications apparatuses, the request information requesting the assignment-destination communications apparatus to execute the data processing and to transmit execution results of the data processing, and when execution of the data processing is not completed by the assignment-destination communications apparatus, receives information that causes the data processing to be executed by a communications apparatus that is not between the given communications apparatus and the assignment-destination communications apparatus, judges whether the assignment-destination communications apparatus indicated by identification information included in the received request information is the communications apparatus, executes the data processing that is based on the received request information, upon judging that the assignment-destination communications apparatus is the communications apparatus, and refrains from executing the data processing that is based on the received request information, upon judging that the assignment-destination communications apparatus is not the communications apparatus, transmits to the nearby communications apparatus of the communications apparatus when execution of the data processing indicated by the received request information is not completed, request information that includes the second identification information stored in the storage device and requests the second specified communications apparatus to execute the data processing that has not been completed and to transmit execution results of the data processing, and when the data processing is not completed by the second specified communications apparatus, transmits information that causes the communications apparatus that is not between the second specified communications apparatus and the given communications apparatus to execute the data processing, and execution results of the data processing that has been completed.

6. A system comprising:

a plurality of first communications apparatuses; and a second communications apparatus that performs a process based on execution results of data processing of at least one communications apparatus among the plurality of first communications apparatuses that perform multi-hop communication thereamong to transmit the execution results to the second communications apparatus, wherein each communication apparatus among the plurality of first communications apparatuses:
has a storage device storing therein identification information of a specified communications apparatus that is among the plurality of first communications apparatuses, exclusive of the communications apparatus and that requires plural hops in communicating with the second communications apparatus, and
transmits to a nearby communications apparatus of the communications apparatus, request information that includes the identification information stored in the storage device, requests the specified communications apparatus to execute data processing of the communications apparatus, and to transmit execution results of the data processing, wherein each communication apparatus of the plurality of first communications apparatuses:
receives from the nearby communications apparatus of the communications apparatus, request information that includes identification information that is of an assignment-destination communications apparatus and stored in a storage device of another communications apparatus that is among the plurality of first communications apparatuses, and requests the assignment-destination communications apparatus to execute data processing that is based on the received request information and to transmit execution results of the data processing,
judges whether the assignment-destination communications apparatus indicated by the identification information included in the received request information is the communications apparatus,
executes the data processing that is based on the received request information, upon judging that the assignment-destination communications apparatus is the communications apparatus, and refrains from executing the data processing that is based on the received request information, upon judging that the assignment-destination communications apparatus is not the communications apparatus,
transmits execution results to the nearby communications apparatus of the communications apparatus, upon judging that the assignment-destination communications apparatus is the communications apparatus and when completing execution of the data processing, and
transmits request information that includes the identification information stored in the storage device and execution results of the data processing that is based on the received request information and that has been completed, the request information further requesting execution of the data processing that has not been completed and transmission of execution results of the data processing, the request information and the execution results being transmitted to the nearby communications apparatus of the communications apparatus, upon judging that the assignment-destination communications apparatus is the communications apparatus and when not completing execution of the data processing.

7. The system according to claim 6, wherein
the storage device of each communication apparatus of the plurality of first communications apparatuses:
when the second communications apparatus is provided in plural, stores first identification information of a first specified communications apparatus that is between the communication apparatus and a given communications apparatus that is among the plurality of first communications apparatuses and requires plural hops in communicating with each second communications apparatus, and second identification information of a second specified communications apparatus that is not between the communications apparatus and the given communications apparatus,
each communication apparatus of the plurality of first communications apparatuses:
transmits to the nearby communications apparatus of the communications apparatus, request information that includes the first identification information stored in the storage device and that requests the first specified communications apparatus to execute data processing of the communications apparatus and to transmit execution results of the data processing,
the given communications apparatus:
receives the request information,
judges whether a communications apparatus indicated by identification information included in the received request information is the given communications apparatus,
upon judging that the indicated communications apparatus is the given communications apparatus, transmits to the nearby communications apparatus of the given communications apparatus, request information that includes any one among the first identification information and the second identification information stored in the storage device, and requests any one among the first specified communications apparatus and the second specified communications apparatus to execute the data processing indicated by the received request information and to transmit execution results of the data processing, and when the data processing is not completed by the requested one among the first specified communications apparatus and the second specified communications apparatus, transmits information that causes the data processing to be executed by a communications apparatus that is not between the given communications and, the first specified communications apparatus or the second specified communications apparatus,
each communications apparatus of the plurality of first communications apparatuses:
receives request information that includes identification information that is of an assignment-destination communications apparatus and stored in a storage device of another communications device among the plurality of first communications apparatuses, the request information requesting the assignment-destination communications apparatus to execute the data processing and to transmit execution results of the data processing, and when execution of the data processing is not completed by the assignment-destination communications apparatus, receives information that causes the data processing to be executed by a communications apparatus that is not between the given communications apparatus and the assignment-destination communications apparatus,
judges whether the assignment-destination communications apparatus indicated by identification information included in the received request information is the communications apparatus,
executes the data processing that is based on the received request information, upon judging that the assignment-destination communications apparatus is the communications apparatus, and refrains from executing the data processing that is based on the received request information, upon judging that the assignment-destination communications apparatus is not the communications apparatus, transmits to a nearby communications apparatus of the communications apparatus when execution of the data processing indicated by the received request information is not completed, request information that includes the second identification information stored in the storage device and requests the second specified communications apparatus to execute the data processing that has not been completed and to transmit execution results of the data processing, and when the data processing is not completed by the second specified communications apparatus, transmits information that causes the communications apparatus that is not between the second specified communications apparatus and the given communications apparatus to execute the data processing, and execution results of the data processing that has been completed.

8. The system according to claim 7, wherein
the given communications apparatus transmits to the nearby communications apparatus of the given communications apparatus, a registration signal that requests registration of the first specified communications apparatus,
the plurality of first communications apparatuses perform multi-hop communication of the registration signal,
each communication apparatus of the plurality of first communications apparatuses:
   receives the registration signal from the nearby communications apparatus of the communications apparatus,
   stores to the storage device, the first identification information indicating a transmission source of the received registration signal, when the first identification information is not stored in the storage device,
   receives from the nearby communications apparatus of the communications apparatus, a reception signal indicating that the first identification information has been stored to the storage device based on the received registration signal,
   receives from the nearby communications apparatus of the communications apparatus, the reception signal that corresponds to the registration signal in which the transmission source is the communications apparatus, and
   stores to the storage device, the second identification information that indicates the transmission source of the reception signal, the transmission source being included in the reception signal.

9. The system according to claim 8, wherein
each communications apparatus of the plurality of first communications apparatuses:
   stores to the storage device, the second identification information that indicates the transmission source of the received registration signal, the second identification information being stored when the reception signal that corresponds to the registration signal transmitted to the nearby communications apparatus is not received within a given period after transmission of the registration signal,
   receives from the nearby communications apparatus of the communications apparatus, request information that includes identification information of an assignment-destination communications apparatus stored in a storage device of another communication apparatus among the plurality of first communications apparatuses and requests the assignment-destination communications apparatus to execute the data processing and to transmit execution results of the data processing, and when execution of the data processing is not completed by the assignment-destination communications apparatus, receives information that causes the communications apparatus that is not between the assignment-destination communications apparatus and the communications apparatus to execute the data processing,
   judges whether the assignment-destination communications apparatus indicated by the identification information included in the request information is the communications apparatus,
   executes the data processing that is based on the received request information, upon judging that the assignment-destination communications apparatus is the communications apparatus, and refrains from executing the data processing that is based on the received request information, upon judging that the assignment-destination communications apparatus is not the communications apparatus,
   when the data processing indicated by the received request information is not completed and the first identification information and the second identification information stored in the storage device are identical, transmits to the nearby communications apparatus of the communications apparatus, request information that includes the identification information that is of the first specified communications apparatus and stored in the storage device and requests the first specified communications apparatus to execute the data processing that is indicated by the received request information and has not been completed and to transmit execution results of the data processing, and when the data processing is not completed by the first specified communications apparatus, transmits information that causes the communications apparatus that is between the first specified communications apparatus and the given communications apparatus to execute the data processing, and execution results of the complete data processing.

10. A communications method of a given communications apparatus included in a plurality of first communications apparatuses, among which at least execution results of data processing of the given communications apparatus is communicated by multi-hop communication whereby, the execution results are transmitted to a second communications apparatus that performs a process based on the execution results, the communications method comprising:
   transmitting to a nearby communications apparatus of the given communications apparatus, request information that includes identification information stored in a storage device storing therein the identification of a specified communications apparatus that is among the plurality of first communications apparatuses, exclusive of the given communication apparatus and that requires plural hops in communicating with the second communications, the request information further requesting the specified communications apparatus to execute the data processing of the given communications apparatus and to transmit execution results of the data processing, wherein each communication apparatus of the plurality of first communications apparatuses:
receives from a nearby communications apparatus of the communications apparatus, request information that includes identification information that is of an assignment-destination communications apparatus and stored in a storage device of another communications apparatus that is among the plurality of first communications apparatuses, and requests the assignment-destination communications apparatus to execute data processing that is based on the received request information and to transmit execution results of the data processing,
judges whether the assignment-destination communications apparatus indicated by the identification information included in the received request information is the communications apparatus,
executes the data processing that is based on the received request information, upon judging that the assignment-destination communications apparatus is the communications apparatus, and refrains from executing the data processing that is based on the received request information, upon judging that the assignment-destination communications apparatus is not the communications apparatus,
transmits execution results to the nearby communications apparatus of the communications apparatus, upon judging that the assignment-destination communications apparatus is the communications apparatus and when completing execution of the data processing,
transmits request information that includes the identification information stored in the storage device and execution results of the data processing that is based on the received request information and that has been completed, the request information further requesting execution of the data processing that has not been completed and transmission of execution results of the data processing, the request information and the execution results being transmitted to the nearby communications apparatus of the communications apparatus, upon judging that the assignment-destination communications apparatus is the communications apparatus and when not completing execution of the data processing.

11. The communications method according to claim 10, wherein
the storage device of each communication apparatus of the plurality of first communications apparatuses:
when the second communications apparatus is provided in plural, stores first identification information of a first specified communications apparatus that is between the communication apparatus and a given communications apparatus that is among the plurality of first communications apparatuses and requires plural hops in communicating with each second communications apparatus, and second identification information of a second specified communications apparatus that is not between the communications apparatus and the given communications apparatus,
each communication apparatus of the plurality of first communications apparatuses:
transmits to the nearby communications apparatus of the communications apparatus, request information that includes the first identification information stored in the storage device and that requests the first specified communications apparatus to execute data processing of the communications apparatus and to transmit execution results of the data processing,
the given communications apparatus:
receives the request information,
judges whether a communications apparatus indicated by identification information included in the received request information is the given communications apparatus,
upon judging that the indicated communications apparatus is the given communications apparatus, transmits to the nearby communications apparatus of the given communications apparatus, request information that includes any one among the first identification information and the second identification information stored in the storage device, and requests any one among the first specified communications apparatus and the second specified communications apparatus to execute the data processing indicated by the received request information and to transmit execution results of the data processing, and when the data processing is not completed by the requested one among the first specified communications apparatus and the second specified communications apparatus, transmits information that causes the data processing to be executed by a communications apparatus that is not between the given communications and, the first specified communications apparatus or the second specified communications apparatus,
each communications apparatus of the plurality of first communications apparatuses:
receives request information that includes identification information that is of an assignment-destination communications apparatus and stored in a storage device of another communications device among the plurality of first communications apparatuses, the request information requesting the assignment-destination communications apparatus to execute the data processing and to transmit execution results of the data processing, and when execution of the data processing is not completed by the assignment-destination communications apparatus, receives information that causes the data processing to be executed by a communications apparatus that is not between the given communications apparatus and the assignment-destination communications apparatus,
judges whether the assignment-destination communications apparatus indicated by identification information included in the received request information is the communications apparatus,
executes the data processing that is based on the received request information, upon judging that the assignment-destination communications apparatus is the communications apparatus, and refrains from executing the data processing that is based on the received request information, upon judging that the assignment-destination communications apparatus is not the communications apparatus,
transmits to the nearby communications apparatus of the communications apparatus when execution of the data processing indicated by the received request information is not completed, request information that includes the second identification information stored in the storage device and requests the second specified communications apparatus to execute the data processing that has not been completed and to transmit execution results of the data processing, and when the data processing is not completed by the second specified communications apparatus, transmits information that causes the communications apparatus that is not between the second specified communications apparatus and the given communications apparatus to execute the data processing, and execution results of the data processing that has been completed.

* * * * *